US012455397B2

(12) United States Patent
Yan et al.

(10) Patent No.: US 12,455,397 B2
(45) Date of Patent: Oct. 28, 2025

(54) METHOD FOR EVALUATING THICKNESSES OF COBALT-RICH CRUSTS ON SEAMOUNTS

(71) Applicants: The First Institute of Oceanography, MNR, Qingdao (CN); Pilot National Laboratory for Marine Science and Technology(Qingdao), Qingdao (CN); National Marine Data Information Center, Tianjin (CN)

(72) Inventors: Shijuan Yan, Qingdao (CN); Chengfei Hou, Qingdao (CN); Gang Yang, Qingdao (CN); Xiande Tian, Tianjin (CN); Xiangwen Ren, Qingdao (CN); Jun Ye, Qingdao (CN); Zhiwei Zhu, Qingdao (CN); Qinglei Song, Qingdao (CN); Zhuanling Song, Qingdao (CN); Mu Huang, Qingdao (CN); Yue Hao, Qingdao (CN); Chunhua Han, Tianjin (CN); Dewen Du, Qingdao (CN)

(73) Assignees: The First Institute of Oceanography, MNR, Qingdao (CN); Pilot National Laboratory for Marine Science and Technology (Qingdao), Qingdao (CN); National Marine Data Information Center, Tianjin (CN)

( * ) Notice: Subject to any disclaimer, the term of this patent is extended or adjusted under 35 U.S.C. 154(b) by 356 days.

(21) Appl. No.: 18/306,583

(22) Filed: Apr. 25, 2023

(65) Prior Publication Data
US 2024/0168196 A1    May 23, 2024

(30) Foreign Application Priority Data
Nov. 21, 2022   (CN) .......................... 202211456575.5

(51) Int. Cl.
*G01V 99/00*        (2024.01)

(52) U.S. Cl.
CPC .................................... *G01V 99/00* (2013.01)

(58) Field of Classification Search
None
See application file for complete search history.

(56) References Cited

FOREIGN PATENT DOCUMENTS

CN           111880239 A   *  11/2020   ............... G01V 9/00

OTHER PUBLICATIONS

Du, Dewen, et al. "An integrated method for the quantitative evaluation of mineral resources of cobalt-rich crusts on seamounts." Ore Geology Reviews 84 (2017): 174-184 (Year: 2017).*

(Continued)

*Primary Examiner* — Lina Cordero

(57) ABSTRACT

Disclosed is a method for evaluating thicknesses of cobalt-rich crusts on seamounts, which comprises following steps: dividing a study area of cobalt-rich crusts into geological grid units, assigning crust thickness values to geological grid units; obtaining the crust thicknesses of the geological sampling stations in a preset influence range in the adjacent areas based on geological sampling station information; estimating the crust thicknesses in a certain distance range of the stations by a "distance-slope" spatial interpolation method, and through a spatial similarity of a crusts spatial distribution caused by a relationship between the distance and the slope, assigning values to grid units outside adjacent areas and within an influence range of the spatial similarity relationship; assigning values to the geological grid units that failed to obtain crust thickness value through an expected assignment method, and obtaining the crust thicknesses of the study areas.

8 Claims, 25 Drawing Sheets

(56) References Cited

OTHER PUBLICATIONS

Du, Dewen, et al. "Distance-gradient-based variogram and Kriging to evaluate cobalt-rich crust deposits on seamounts." Ore Geology Reviews 84 (2017): 218-227 (Year: 2017).*
Du, Dewen, et al. "Kriging interpolation for evaluating the mineral resources of cobalt-rich crusts on Magellan Seamounts." Minerals 8.9 (2018): 374 (Year: 2018).*
CN111880239A translation (Year: 2020).*

* cited by examiner

```
┌─────────────────────────────────────────────────────────────┐
│ dividing study areas of cobalt-rich crusts resources into    │
│ geological grid units, and dividing the study areas into     │──S1
│ several adjacent areas based on geological sampling          │
│ stations, of which the adjacent areas include the            │
│ geological grid units and the geological sampling stations   │
└─────────────────────────────────────────────────────────────┘
                              ⇓
┌─────────────────────────────────────────────────────────────┐
│ obtaining thicknesses of crusts of the geological sampling   │
│ stations in a preset influence range in the adjacent areas   │──S2
│ based on geological sampling information of the geological   │
│ sampling stations                                            │
└─────────────────────────────────────────────────────────────┘
                              ⇓
┌─────────────────────────────────────────────────────────────┐
│ assigning values to the geological grid units in the         │
│ adjacent areas based on the thicknesses of crusts in the     │──S3
│ preset influence range in the adjacent area, and obtaining   │
│ the thicknesses of crusts of the geological grid units in    │
│ the adjacent areas                                           │
└─────────────────────────────────────────────────────────────┘
                              ⇓
┌─────────────────────────────────────────────────────────────┐
│ assigning values to the geological grid units that fail to   │
│ be assigned by using an expected assignment method, so as    │──S4
│ to obtain thicknesses of crusts of the study areas           │
└─────────────────────────────────────────────────────────────┘
```

FIG. 1

METHOD FOR EVALUATING THICKNESSES OF COBALT-RICH CRUSTS ON SEAMOUNTS

CROSS-REFERENCE TO RELATED APPLICATIONS

This application claims priority to Chinese Patent Application No. 202211456575.5, filed on Nov. 21, 2022, the contents of which are hereby incorporated by reference.

TECHNICAL FIELD

The application relates to the technical field of a cobalt metal resource evaluation, and in particular to a method for evaluating thicknesses of cobalt-rich crusts on seamounts.

BACKGROUND

As a kind of mineral resource with rich reserves, cobalt-rich crusts on seamounts have attracted worldwide attention in recent twenty years. It is of great significance to evaluate cobalt-rich crust resources and calculate the spatial distribution of resources on the basis of certain geological exploration works.

The indicators related to the quality, grade and reserves of mineral resources, such as the thickness, the wet density, the moisture content, the coverage, the metal concentration, etc. of cobalt-rich crusts are collectively referred to as cobalt-rich crusts parameters, and the thickness of cobalt-rich crusts is an important parameter for evaluating the cobalt-rich crust resources.

There has been much research on the metallogenic regularity and influencing factors of cobalt-rich crusts. For example, the research on the relationship between the crust mineralization and bedrock types: the crust bedrocks are mainly the basalt, the pyroclastic rock, the phosphorite, the siliceous rock, the biochemical limestone, etc. The thickness of crusts on the basalt, on the volcanic rock and on the phosphorite is larger than the thickness of crusts on the siliceous rock, and the formation of crusts is closely related to the water depth. The average thickness of crusts with the pyroclastic rock and the basalt as basements is the largest, the thickness of crusts on the surface of loose and fragile rocks such as the tuff and the phosphorite is small, and the siliceous rock is not conducive to the growth of crusts. The forming substance of crusts mainly comes from sea water and is little affected by the bedrocks. Another example is the research on the relationship between the water depth and the thickness of cobalt-rich crusts: the growth of crusts is closely related to the water depth of seamounts. On a global scale, crusts grow in places with the water depth range of 400 meters-4000 meters, which is mainly restricted by the oxygen minimum zone (OMZ) and the carbonate compensation depth (CCD) of seawater, and crusts grow on the seamount slope between the oxygen minimum zone and the carbonate compensation depth. The growth of crusts in places with different water depth ranges is also different. On the whole, 80% of crusts with a thickness of 41 millimeters grow in places with a water depth range of 1000 meters-3000 meters, where the water depth range of 1500 meters-2500 meters accounts for 55%. Similarly, among crusts with various thicknesses grow in places with a water depth of less than 2800 meters, half of the crusts have a thickness larger than 50 millimeters, where crusts with the thickness larger than 100 millimeters mainly grow on Pacific seamount with a water depth of less than 2500 meters.

At present, the following methods are mainly used to evaluate the thickness of cobalt-rich crusts: a. the average crust thickness is mostly used for estimation. When the statistical grid lacks investigation stations, the crust thickness information of adjacent stations is used to estimate the thicknesses of adjacent areas; b. the research on estimating the thicknesses of crusts by a spatial interpolation method, for example, in the "distance-slope" Kriging interpolation method, the thicknesses of crusts are estimated according to the topographic slope and the distance between stations; and c. there is also a constraint mechanism of the crust deposition and the mineralization, or a fractal method, which may be used to estimate the thicknesses of crusts according to topographic features.

However, the single evaluation method has both its pros and cons in application, the respective advantages can't be fully and comprehensively utilized. The single evaluation method may only give a most appropriate evaluation at the current level of exploration and research, but resulting in that the estimation results cannot better express the thickness distribution, which increases the uncertainty in the regional resources evaluation. For example, 1. The most accurate thickness data may be obtained according to the station survey, but it is difficult to comprehensively estimate the thicknesses in the whole area due to the sparse data. 2. The interpolation method estimates the thicknesses of crusts according to the spatial distribution of stations and the topography, and gives a more comprehensive prediction range. However, in the case of insufficient stations, the estimation accuracy is limited, and the farther away from the known information points, the lower the reliability is. 3. Based on the constraint mechanism and the metallogenic regularity of the crust deposition and the mineralization, the regional crust thickness is estimated statistically according to the topographic features. This evaluation method is suitable for large-scale comparison, especially for multiple seamounts, but its local specificity may not be reflected.

SUMMARY

In order to solve the above technical problems, the present application provides a method for evaluating thicknesses of cobalt-rich crusts on seamounts, which is suitable for evaluating the thicknesses of seamount crusts under the condition of incomplete investigation.

In order to achieve the above technical purpose, the present application provides a method for evaluating thicknesses of cobalt-rich crusts on seamounts, including following steps:

S1, dividing study areas of cobalt-rich crusts resources into geological grid units, and dividing the study areas into several adjacent areas based on geological sampling stations, of which the adjacent areas include the geological grid units and the geological sampling stations;

S2, obtaining thicknesses of crusts of the geological sampling stations in a preset influence range in the adjacent areas based on geological sampling information of the geological sampling stations;

S3, assigning values to the geological grid units in the adjacent areas based on the thicknesses of crusts in the preset influence range in the adjacent area, and obtaining the thicknesses of crusts of the geological grid units in the adjacent areas; and S4, assigning values to the geological grid units that fail to be assigned by using an expected assignment method, so as to obtain thicknesses of crusts of the study areas.

Optionally, dividing the study area into several adjacent areas includes:

drawing normals of connecting lines between two adjacent points of the geological sampling stations, obtaining intersection points between the normals and boundaries of the study areas, obtaining cross nodes between the normals, dividing the study areas into several adjacent areas based on the normals, the intersection points and the cross nodes; for cases where there is a cross node between the normals, removing a part of the normal beyond the cross node, and the intersection point formed by an end of the normal beyond the cross node and the boundary of the study area.

Optionally, dividing the study area into several adjacent areas further includes:

combining several geological sampling stations with preset spatial thresholds into one geological sampling station, and connecting lines based on the combined geological sampling stations.

Optionally, obtaining the thicknesses of crusts in the preset influence range in the adjacent areas includes:

obtaining the thicknesses of crusts of preset buffer zones based on the geological sampling information of the geological sampling stations, and obtaining the thicknesses of crusts in the preset influence range in the adjacent areas by combining Thiessen polygons and the preset buffer zones based on the thickness of crusts of the preset buffer zones.

Optionally, assigning values to the geological grid units in the adjacent areas includes:

estimating the thicknesses of crusts of the geological sampling stations in the preset distance range based on a "distance-slope" spatial interpolation method, and through a spatial similarity of a spatial distribution of crusts caused by a relationship between the distance and the slope, and assigning values to grid units inside and outside the adjacent areas and within an influence range of the spatial similarity relationship.

Optionally, the "distance-slope" spatial interpolation method includes:

acquiring slopes of geological grid units in the adjacent areas;

carrying out a spatial overlay and a spatial correlation on slopes of the geological sampling stations and the geological grid units to obtain an average slope of each geological sampling station;

obtaining an isobath distance from each geological sampling station to a lower boundary of the study area, taking the isobath distance as a coordinate value of the "distance-slope" coordinate system of the geological sampling stations, regenerating the geological sampling station into a spatial layer based on the coordinate value, carrying out a variogram simulation on crust thickness data by a geostatistical analysis method for the geological sampling stations in the spatial layer, and carrying out a spatial interpolation with a preset radius according to simulation result parameters of the variogram and investigation experiences on crusts.

Optionally, assigning values to the geological grid units that fail to be assigned by using the expected assignment method, so as to obtain the thicknesses of crusts of the study areas includes:

acquiring topographic slope data of the study areas, performing an unsupervised classification on the topographic slope data, dividing the study areas into different terrain type boundaries according to a topographical change, performing a micro landform classification on the study areas based on the different terrain type boundaries, and obtaining a micro landform classification area, thereby obtaining several geological blocks;

dividing the study areas into several preset geomorphic type areas based on the micro landform classification area, original topographic characteristics and intuitive forms of slope changes, and obtaining several geological blocks related to mineralization stages of seamount crusts based on geomorphic types;

obtaining an original crust thickness average of the geological sampling stations in the preset geomorphic type areas and a crust thickness average of the geological sampling stations in the micro landform classification area based on the spatial distribution of known sampling stations, and obtaining a final crust thickness of the preset geomorphic type areas by superimposing the original crust thickness average of the preset geomorphic type areas and the crust thickness average of the micro landform classification area; assigning values to areas outside the preset influence range of geological sampling stations in the adjacent areas based on the crust thickness of the preset geomorphic type areas, and finally obtaining crust thickness values of the geological grid units in the whole study area.

Compared with the prior art, the application has following advantages and technical effects:

The method may achieve a good effect when applied in evaluating the thicknesses of seamount crusts, may ensure that the local part is taken into consideration, and a more appropriate evaluation is given on the whole, and the present application is suitable for evaluating the thicknesses of seamount crusts under the condition of incomplete investigation.

BRIEF DESCRIPTION OF THE DRAWINGS

The drawings that form a part of this application are used to provide a further understanding of this application. The illustrative embodiments of this application and their descriptions are used to explain this application, and do not constitute any limitations on this application. In the attached drawings:

FIG. 1 is a flowchart of a method for evaluating thicknesses of cobalt-rich crusts on seamounts according to an embodiment of the present application.

FIG. 2A is a geographical location map of the study area, FIG. 2B is a topographic map of Il'ichev Guyot seamount and a spatial distribution of crust sampling stations, and FIG. 2C is a 3D topographic map of the study area.

FIG. 3A is an unsupervised classification diagram of Il'ichev Guyot seamount topography, FIG. 3B is a slope analysis diagram of Il'ichev Guyot seamount topography, and FIG. 3C is a micro landform classification diagram of Il'ichev Guyot seamount.

FIG. 7A is a value assignment of mineralized blocks, and FIG. 7B is a value assignment of a buffer zone.

FIG. 9A shows crust thickness distribution parameters of the 1.5 kilometers buffer zone, and FIG. 9B shows crust thickness parameters of the adjacent area of the station obtained by Thiessen polygons.

FIG. 16A shows an assigned crust thickness value for geological grid units according to the expected average thickness value of each micro-topography classification block, FIG. 16B shows an assigned crust thickness value for geological grid units according to the expected average thickness value of each geomorphic classification block, and FIG. 16C shows an assigned crust thickness value for each geological grid unit according to combining above two assignment values.

DETAILED DESCRIPTION OF THE EMBODIMENTS

Figure 2A:
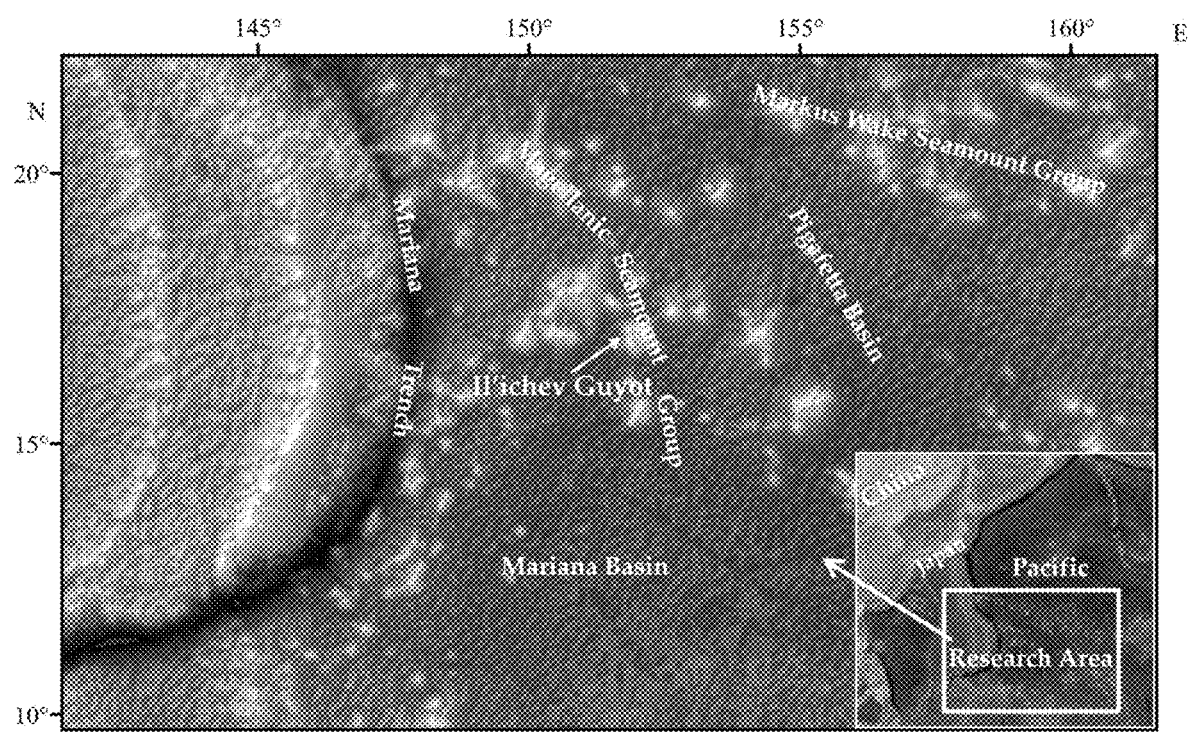
FIG. 2A, FIG. 2B and FIG. 2C are schematic diagrams of Il'ichev Guyot seamount according to the embodiment of the present application; where

It should be noted that without conflict, embodiments in the present application and features in embodiments may be combined with each other. The present application will be described in detail below with reference to the accompanying drawings and in conjunction with embodiments.

It should be noted that the steps shown in the flowchart of the accompanying drawings may be performed in a computer system such as a set of computer-executable instructions, and although a logical order is shown in the flowchart, but in some cases, the steps shown or described may be performed in a different sequence.

Embodiment

As shown in FIG. 1, this embodiment provides a method for evaluating the thicknesses of cobalt-rich crusts on seamounts, the comprehensive method of "adjacent areas-distance and slope interpolation-mathematical expectation" for evaluating the thicknesses of crusts, including:

S1, dividing study areas of cobalt-rich crusts resources into geological grid units, and dividing the study areas into several adjacent areas based on geological sampling stations, of which the adjacent areas include the geological grid units and the geological sampling stations;

S2, obtaining thicknesses of crusts of the geological sampling stations in a preset influence range in the adjacent areas based on geological sampling information of the geological sampling stations;

S3, assigning values to the geological grid units in the adjacent areas based on the thicknesses of crusts in the preset influence range in the adjacent areas, and obtaining the thicknesses of crusts of the geological grid units in the adjacent areas; and S4, assigning values to the geological grid units that fail to be assigned by using an expected assignment method, so as to obtain thicknesses of crusts of the study areas.

Further, dividing the study areas into several adjacent areas includes:

drawing normals of connecting lines between two adjacent points of the geological sampling stations, obtaining intersection points between the normals and boundaries of the study areas, obtaining cross nodes between the normals, dividing the study areas into several adjacent areas based on the normals, the intersection points and the cross nodes; for cases where there is a cross node between the normals, removing a part of the normal beyond the cross node, and the intersection point formed by an end of the normal beyond the cross node and the boundary of the study area.

Further, dividing the study areas into several adjacent areas further includes:

combining several geological sampling stations with preset spatial thresholds into one geological sampling station, and connecting lines based on the combined geological sampling stations.

Further, obtaining the thicknesses of crusts in the preset influence range in the adjacent areas includes:

obtaining the thicknesses of crusts of preset buffer zones based on the geological sampling information of the geological sampling stations, and obtaining the thicknesses of crusts in the preset influence range in the adjacent areas by combining Thiessen polygons and the preset buffer zones based on the thickness of crusts of the preset buffer zones.

Further, assigning values to the geological grid units in the adjacent areas includes:

estimating the thicknesses of crusts of the geological sampling stations in the preset distance range based on a "distance-slope" spatial interpolation method, and through a spatial similarity of a spatial distribution of crusts caused by a relationship between the distance and the slope, and assigning values to grid units inside and outside the adjacent areas and within an influence range of the spatial similarity relationship.

Further, the "distance-slope" spatial interpolation method includes:

acquiring slopes of geological grid units in the adjacent areas;

carrying out a spatial overlay and a spatial correlation on slopes of the geological sampling stations and the geological grid units to obtain an average slope of each geological sampling station;

obtaining an isobath distance from each geological sampling station to a lower boundary of the study area, taking the isobath distance as a coordinate value of the "distance-slope" coordinate system of the geological sampling stations, regenerating the geological sampling station into a spatial layer based on the coordinate value, carrying out the variogram simulation on crust thickness data by a geostatistical analysis method for the geological sampling stations in the spatial layer, and carrying out a spatial interpolation with a preset radius according to simulation result parameters of the variogram and investigation experiences on crusts.

Further, assigning values to the geological grid units that failed to be assigned by using the expected assignment method, so as to obtain the thicknesses of crusts of the study areas includes:

acquiring topographic slope data of the study areas, performing an unsupervised classification on the topographic slope data, dividing the study areas into different terrain type boundaries according to a topographical change, performing a micro landform classification on the study areas based on the different terrain type boundaries, and obtaining a micro landform classification area, thereby obtaining several geological blocks;

dividing the study areas into several preset geomorphic type areas based on the micro landform classification area and combined with original topographic characteristics and intuitive forms of slope changes, and obtaining several geological blocks related to mineralization stages of seamount crusts based on geomorphic types;

obtaining an original crust thickness average of the geological sampling stations in the preset geomorphic type areas and a crust thickness average of the geological sampling stations in the micro landform classification area based on the spatial distribution of known sampling stations, and obtaining a final crust thickness of the preset geomorphic type areas by superimposing the original crust thickness average of the preset geomorphic type areas and the crust thickness average of the micro landform classification area; assigning values to areas outside the preset influence range of geological sampling stations in the adjacent areas based on the crust thickness of the preset geomorphic type areas, and finally obtaining crust thickness values of the geological grid units in the whole study area.

Cobalt-rich crusts on seamounts are rich in cobalt resources, and have attracted worldwide attention. The thickness of cobalt-rich crusts is an important parameter for evaluating the resources of cobalt-rich crusts on seamounts. The evaluation of crust thickness faces two problems. Firstly, due to the high cost, the sampling distribution of the most effective geological stations for seamount exploration is sparse, which is insufficient to estimate the crust thickness distribution in the area; secondly, the single evaluation method has both its pros and cons in application, which can't highlight the advantages of the area where data may be collected, that is, it may ensure that the local area is taken into consideration, and give a more appropriate evaluation on the whole, resulting in the estimation result not fully reflecting the advantages of local data and taking into account the calculation of the overall thickness distribution. Therefore, in this embodiment, under the ArcGIS technical environment, the crust thickness evaluation scheme is comprehensively formulated based on the station survey thickness data and the topographic data. Firstly, calculating the crust thickness in the influence area of the station by using the adjacent area method. This method combined with the station buffer radius and the Thiessen Polygons, estimating the crust thickness estimation within 1.5 kilometers of the survey station is given. Secondly, using "distance-slope" Kriging interpolation method to calculate the crust thickness in the study area, and obtaining the crust thickness in the best effective radius area to make up for the missing part of the previous (the first step) estimation result. Thirdly, dividing the geological blocks by topographic classification method, and estimating the thickness of crusts in the remaining unassigned area by mathematical expectation method, so as to obtain the overall distribution of crust thickness in the study area. This embodiment has achieved good effects in the application of the crust thickness evaluation work of Il'ichev Guyot seamounts. This method is suitable for evaluating the thickness of seamount crusts under the condition of incomplete investigation.

Figure 2B:
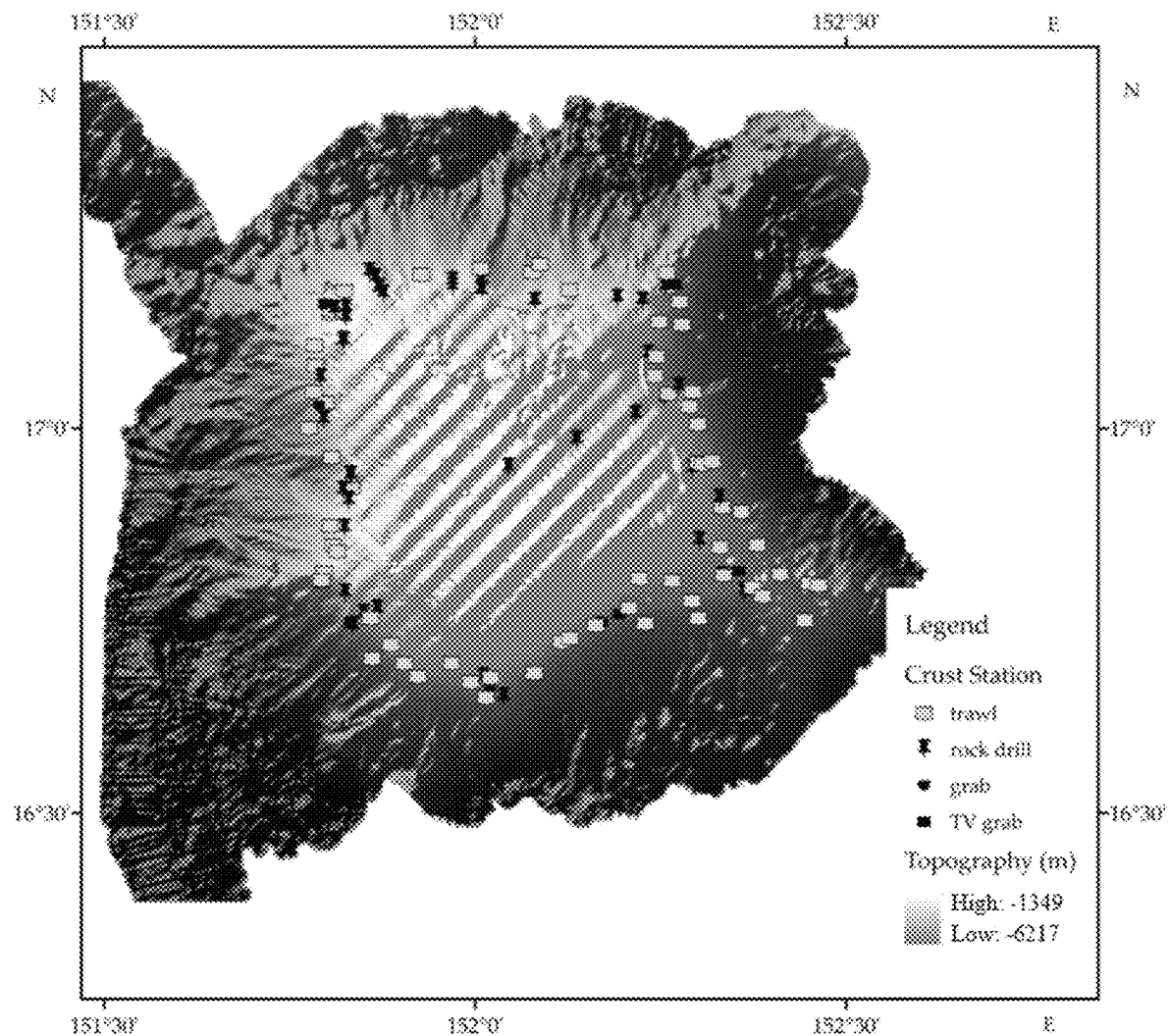
Figure 2C:
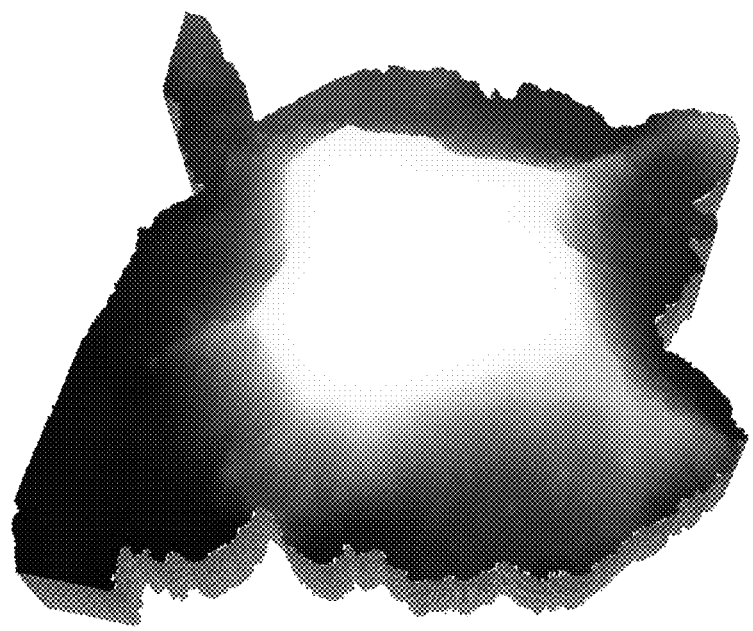

The specific implementation steps of this method are explained in detail by taking Il'ichev Guyot Seamounts as an example:

Il'ichev Guyot seamount is located in the Magellan seamount trail in the western Pacific Ocean. It is a guyot, with a square distribution. As shown in FIG. 2A, FIG. 2B and FIG. 2C, early exploration of cobalt-rich crusts is carried out in Il'ichev Guyot seamount in China. Since 1990s, eight voyages including DY95-9, DY95-10, DY105-11, DY105-15, DY105-16A, DY105-17B, DY115-18 and DY115-19 have been carried out for crusts survey. There are 109 crust survey stations in total, including 59 geological trawl survey stations, 40 deep-sea shallow drilling survey stations and 10 other sampling stations. In addition to the geological sampling survey, the explorations of the terrain, the video, etc. are also carried out.

Geological sampling positions of Il'ichev Guyot seamount crusts basically surround the edge and the ridge of the mountain top. The station spacing is uneven, ranging from 1 kilometer-2 kilometers near to 10 kilometers far away, as shown in FIG. 2A, FIG. 2B and FIG. 2C, where FIG. 2A is the geographical location of Il'ichev Guyot seamount; FIG. 2B is the topography and the distribution of geological sampling stations of Il'ichev Guyot seamount; FIG. 2C is the 3D topographic map of Il'ichev Guyot seamount. For the calculation of crust thickness, the rock drill and TV grab samples have clear station coordinates and a unique crust thickness, which are well determined. For the trawl station, due to the long towing distance and large number of samples, the geographical coordinates of the trawl station shall be taken as the middle position of the towing start and the towing departure of the equipment, and the median of the obtained sample thickness shall be taken as the crust thickness, and the crust thickness takes the median of the obtained sample thickness. The crust thickness obtained by the station sampling method is relatively accurate, but its spatial distribution density is far from meeting the requirement of calculating the distribution of crust resources.

Il'ichev Guyot seamount obtains the topographic data through shipborne multibeam survey, and the accuracy of topographic post-processing data is 230 meters, which is much better than that of geological sampling survey, as shown in FIG. 2B and FIG. 2C.

Figure 3A:
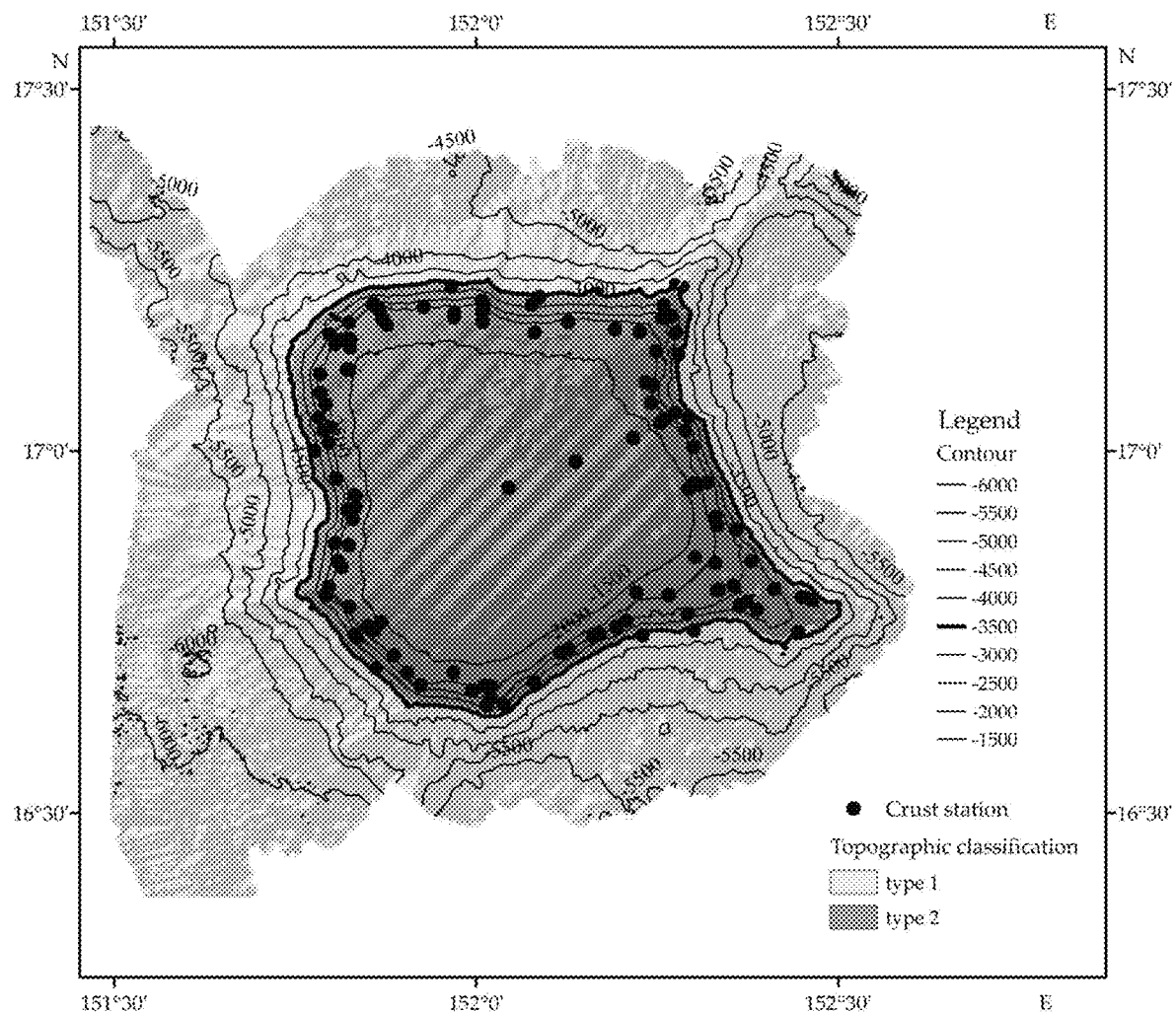
FIG. 3A, FIG. 3B and FIG. 3C are topography analysis diagrams of Il'ichev Guyot seamount according to the embodiment of the present application; where
Figure 3B:
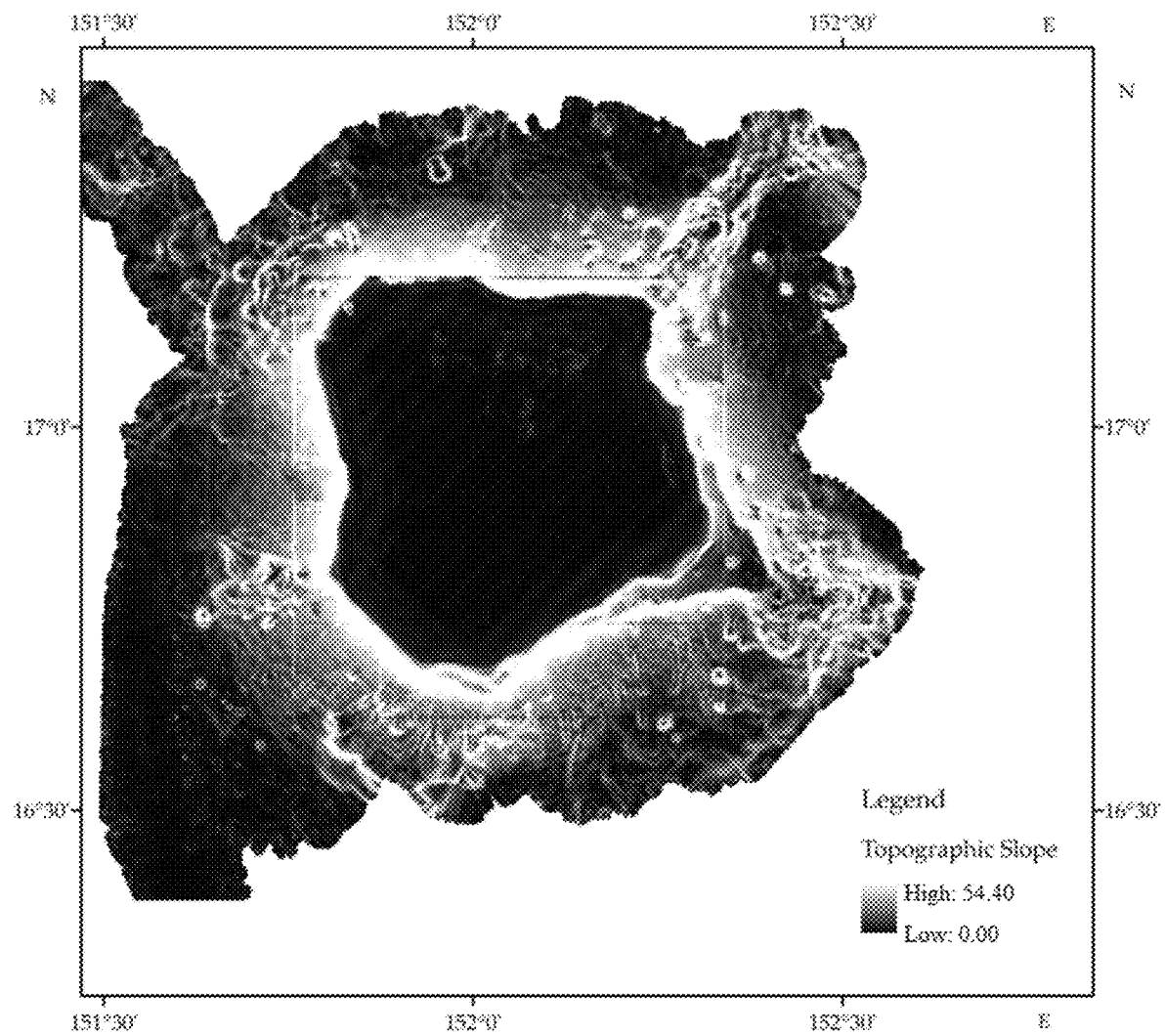
Figure 3C:
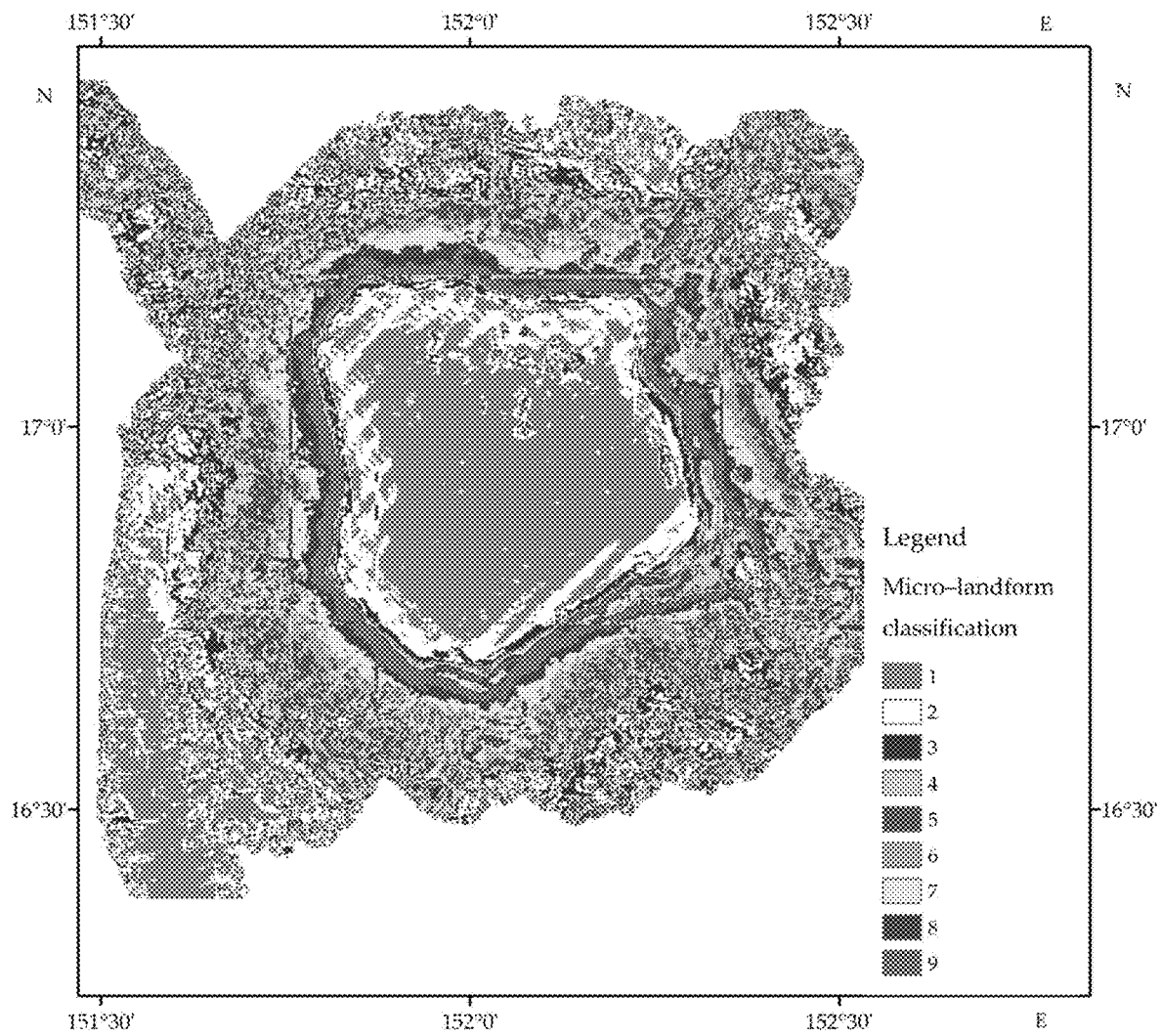

The growth pattern and the thickness of cobalt-rich crusts are related to the topography. Large-scale topography and micro-geomorphology are closely related to the crust distribution. Micro-geomorphology refers to the relatively small-scale geomorphology, which is also the smallest geomorphological unit. Micro-geomorphology is a sub-geomorphology developed on a small geomorphological unit, and it depends on its topographic slope. By calculating the topographic slope of seamount, the rope-like accumulation at the ridge may be clearly seen, while the stations with good crust growth generally fall at the gentle and stable micro-geomorphology in the area with relatively large slope change. As shown in FIG. 3A, FIG. 3B and FIG. 3C, where FIG. 3A is the unsupervised classification diagram of Il'ichev Guyot seamount topography, FIG. 3B is the slope analysis diagram of Il'ichev Guyot seamount topography, and FIG. 3C is the micro landform classification diagram of Il'ichev Guyot seamount.

The growth of cobalt-rich crusts is restricted by the physical and chemical environment of seawater. When the water depth at the edge of seamount top is greater than the minimum oxygen depth, its isobath may be regarded as the upper boundary of ore body; when it is less than the minimum oxygen depth, the minimum oxygen isobath may be regarded as the upper boundary of ore body. The water depth at the edge of Il'ichev Guyot seamount top is greater than the minimum oxygen depth, so the upper limit of ore body is within the control range of crust sampling station. The lower boundary may be the isobath of carbonate compensation interface. It may also be classified by the topographic classification. Here, the unsupervised classification method of Arcmap10.0 is used for analysis, as a result, the seamount topography is divided into two categories. The boundary line of the classification result is 3500 meters isobath, as shown in FIG. 3A. Therefore, the lower boundary of crust thickness estimation in this embodiment is set to 3500 meters, which is just consistent with the depth of carbonate compensation interface (about 3500 meters) where the seamount is located.

Calculating the buffer zone of geological stations based on the above two kinds of data in the ArcGIS10.0 environment, and evaluating the crust thickness in a certain range by stations; estimating the influence range of geological stations by Thiessen Polygons method; dividing geological grid units, calculating the topographic slope and the station distance, and evaluating the crust thickness by "distance-slope" method; as well as the classification of geomorphic types according to topographic data, and the calculation of the average thickness of crusts according to geomorphic types are feasible in terms of data and technology.

1. Methods 1.1 Division of Geological Statistical Units

The statistical unit is the subspace of the evaluation area of cobalt-rich crusts. A cobalt-rich crusts evaluation area contains several statistical units, and the area of the statistical unit is much smaller than that of the evaluation area. If A represents the evaluation area of cobalt-rich crusts, a represents the statistical unit, and n represents the number of units. Then they have a following relationship: $A=\{a_i\}$, $i=1, 2, \ldots, n$.

The statistical unit is the smallest unit of the statistical evaluation, and is given a data set composed of geological features, mineral parameters, resources, etc. The geological characteristics and mineral parameters of a same unit are deemed to be homogenous. Units are deemed as different, that is, the spatial anisotropy of geological features and resource parameters is reflected among units.

The division of statistical units is a basic work of the mineral resources evaluation, and the evaluation results of mineral resources are based on units and expressed by units. Whether the unit division is reasonable or not directly affects the evaluation results of mineral resources. There are two common methods, a geological unit division method and a grid unit division method.

The division method of geological units is a method of delineating statistical units at all levels by applying geological conditions and prospecting marks that have a definite control effect on certain mineral resources. This method has two key characteristics, one is that this method is based on the definite ore-controlling characteristics; the other one is that the ore-controlling conditions and prospecting criteria of different scales or plotting scales are different. For example, the Western-Central Pacific Ocean is taken as the evaluation area of cobalt-rich crusts resources, the seamount landform may be used as an index to divide the geological units for evaluation of cobalt-rich crusts resources, and then all seamounts in the Western-Central Pacific Ocean are geological units; when the seabed resource evaluation area is a seamount, the geological conditions that control the growth of cobalt-rich crusts, such as slope gradient and water depth, are the basis for the division of geological units. The essence of this geological unit is to divide the seamount slope blocks with similar ore-controlling conditions and adjacent spaces into one geological unit; when the water depth and the slope of the seamount slopes are similar, the areas adjacent to each geological station are divided into different geological units. Different scales of cobalt-rich crust resources evaluation have different geological units and different geological indicators.

The grid unit division refers to dividing the evaluation area into several units with regular grids, and taking grids as statistical units. The grid unit fits spatial data analysis techniques, such as the spatial interpolation of various mineral parameters, the spatial extraction of geological features, etc.

The three scale division methods may also be used simultaneously in the resource evaluation of the previous scale. For example, all three methods may be used in the large scale, while the topographic classification method and the survey station adjacent area method may be used in the resource evaluation of the seamount scale.

The working area of seabed mineral resources evaluation (such as the investigation area, the exploration area, the resource evaluation task area, etc., collectively referred to as the seabed evaluation area) is vast. The smaller one, such as a seamount, covers an area of thousands of square kilometers, while the larger one, such as the CC area of the Pacific Ocean with polymetallic nodules, covers an area of millions of square kilometers. The seabed evaluation area is at least equivalent to dozens of land geological maps with a scale of 1:100,000. Land large scale (1:10,000, 1:50,000, 1:100, 000). The first thing that needs to be done in mineral resources evaluation is to divide statistical units, especially in the seabed evaluation. The division of geological statistical units of cobalt-rich crust resources may include the following three methods:

1.1.1 The Topographic Classification (the Geological Block Method)

The distribution of cobalt-rich crusts is controlled by the slope type and the water depth. The slopes of seamounts are classified according to their slopes. The gentle slopes are generally covered by loose sediments without cobalt-rich crusts, the larger slopes are generally covered by cobalt-rich crusts, and the steep slopes may have experienced landslide without cobalt-rich crusts. The thickness, the coverage and the grade of cobalt-rich crusts vary with the water depth. According to the water depth and the topography, the adjacent areas with similar distribution of cobalt-rich crust resources are divided. According to the classification of water depth, the boundary of ore body may be divided. According to the classification of slopes, the geomorphological types of seamount slopes may be distinguished. The micro-geomorphology of seamount slopes may be divided. In order to explore its original distribution law, the unsupervised classification method is adopted for water depth classification in this embodiment. The third-order difference method is used to calculate the slope.

1.1.2 Adjacent Area Method

Dividing the geostatistical unit of the whole research target area by the adjacent area method is to divide polygon blocks with sampling points as the center, and each block surrounds one sampling point. These polygon sets together to form the whole mining area, and the mineral parameters of each sampling point are regarded as the mineral parameters of the corresponding polygon block.

Figure 4:
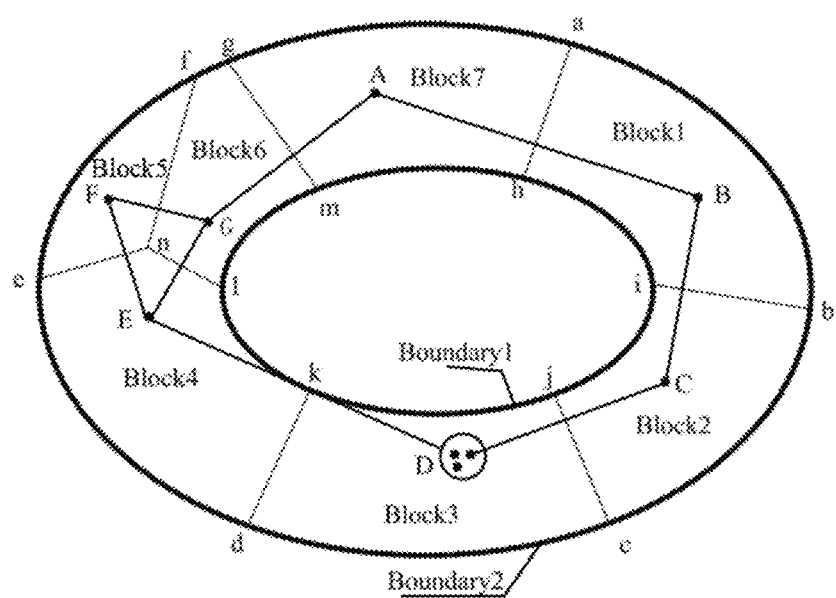
FIG. 4 is a schematic diagram of dividing geological units by a geological station adjacent area method according to the embodiment of the present application.

As shown in FIG. 4, firstly, combining several geological stations with very close space into one station, for example, station D is the combination of three geological sampling points; secondly, connecting two adjacent points of geological stations to draw normal lines (vertical bisectors), for example, the intersection points of AB's vertical bisector ah and boundaries Boundary 1 and Boundary 2 are a and h, the intersection points of BC's vertical bisector and the boundary are b and i; or the vertical bisectors intersect with each other to form nodes, such as n, these nodes circle the adjacent areas of the corresponding geological stations with the geological stations as the center, such as abih circle the blocks adjacent to station B, lnfgm circle the adjacent area of geological station G, Block6, etc., and finally obtaining geological units such as Block1, Block2, . . . , Block7, etc. These divided blocks are blocks adjacent to geological stations. These geological units are automatically given the geological characteristics and mineral parameters of the included geological stations or the average values of multiple geological stations.

1.1.3 Division of Geological Units by the Grid Method

Figure 5:
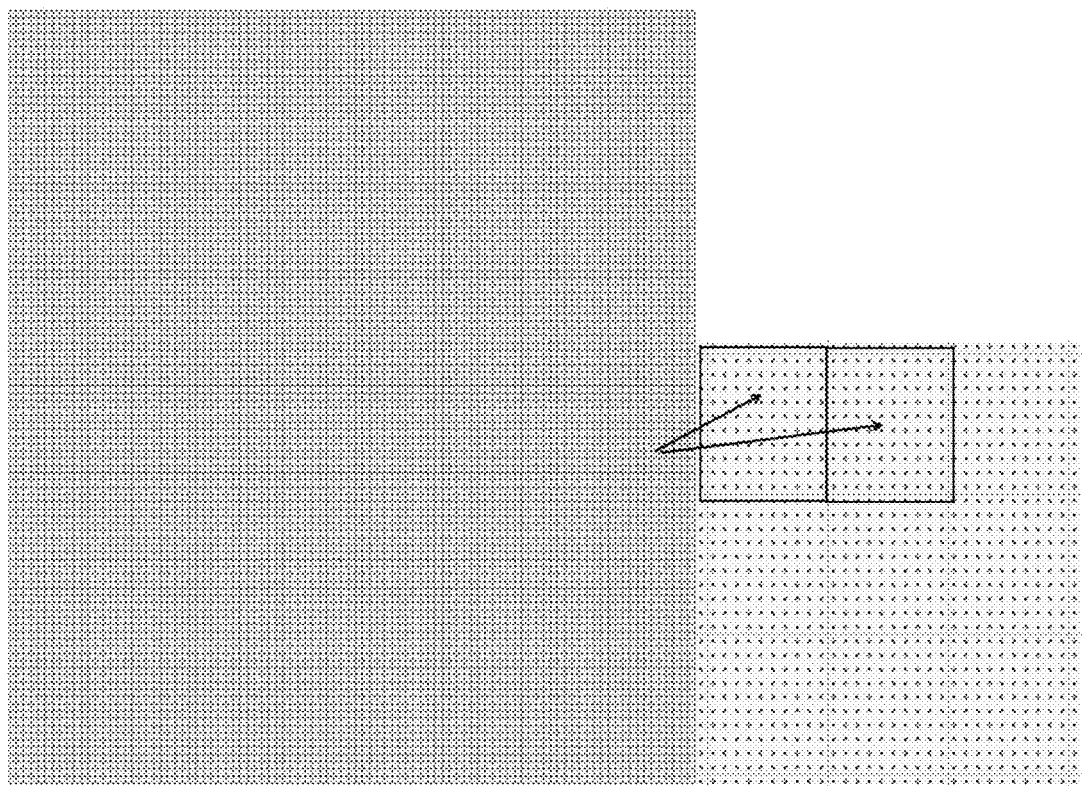
FIG. 5 is a schematic diagram of geological grid unit division according to the embodiment of the present application; the left in FIG. 5 is a regional grid unit, and the right in FIG. 5 is the information point contained in each grid unit.

The size of the grid unit is comprehensively determined according to the data accuracy and the evaluation accuracy requirements of the evaluation area. It is of statistical significance to ensure that the statistical results of grid units meet the evaluation accuracy requirements of the region at a specific stage, and that the number of information points contained in each grid unit may meet the statistical requirements. As shown in FIG. 5, the evaluation area is divided into several 1-kilometer grid units, and each grid unit contains 10×10 information points. According to the data accuracy and the need of evaluation and calculation, regional grid units are divided.

1.2 Geological Statistical Unit Assignment Method

Assigning a resource parameter value to each statistical unit $Unit_i$ (i=1, 2, . . . , N) is a prerequisite for estimating the resource amount of the statistical unit. The crust thickness is the most important parameter in the evaluation of cobalt-rich crust resources. The following is a description of the crust thickness assignment method of geostatistical unit.

1.2.1 Mineralized Block Assignment Method

Figure 6:
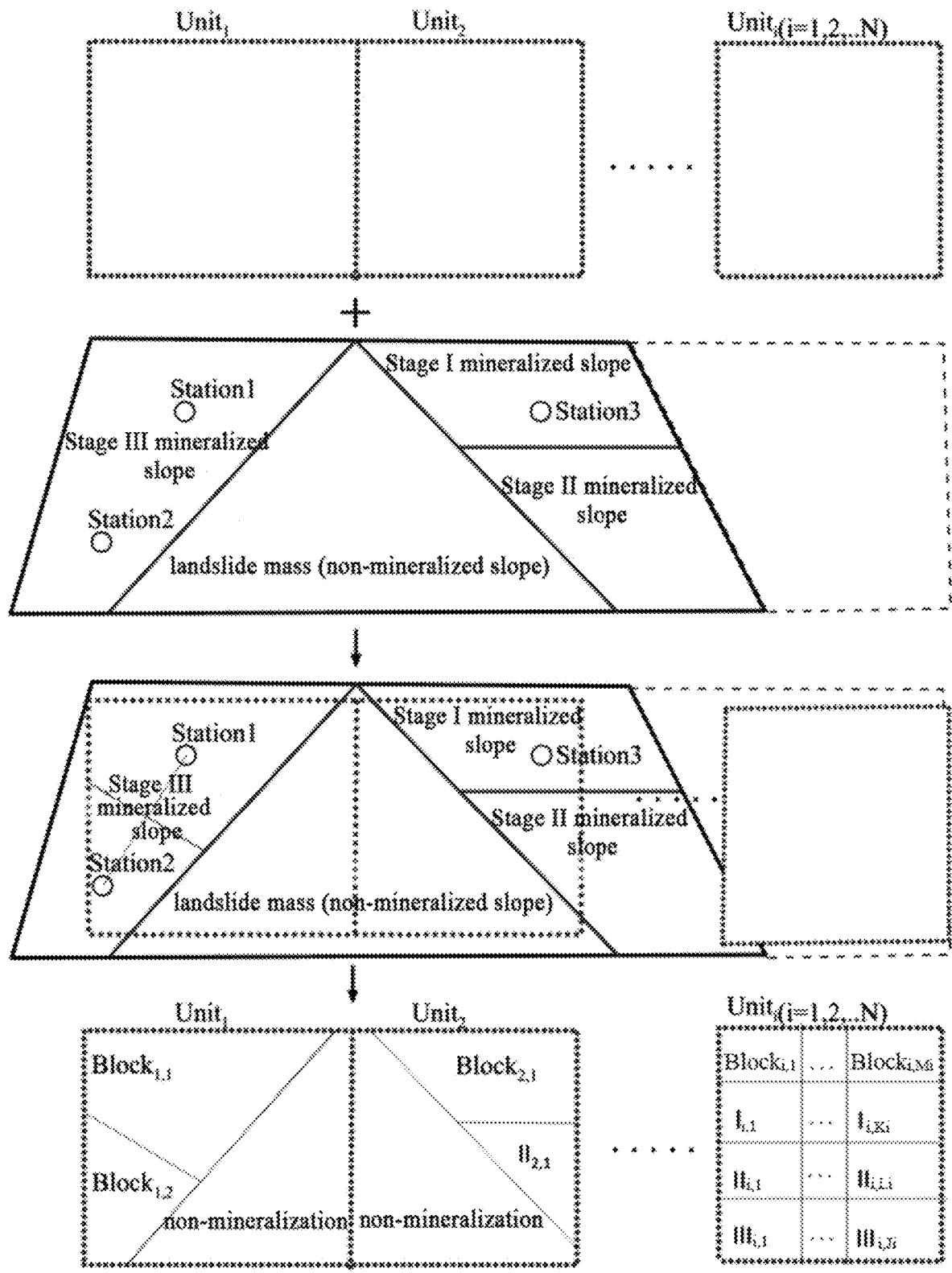
FIG. 6 is a schematic diagram of a slope mineralized block of a divided statistical unit according to the embodiment of the present application.

Firstly, dividing the grid according to a certain shape and specification to generate N statistical unit layers (As shown in FIG. 5 and FIG. 6), and then dividing the seamount slopes into non-mineralized slopes (landslide mass or loose sediment covered areas) and Stage I, Stage II and Stage III mineralized slopes (As shown in FIG. 6) by using the prior knowledge, the survey data and the topographic features to generate slope mineralization type zoning layers. These mineralization zones control the resource parameters of cobalt-rich crusts to some extent. For example, the thickness of 2-3 layers of cobalt-rich crusts developed on the Stage I mineralized slope and the Stage II mineralized slope is generally larger than that of 1 layer of crusts developed on the Stage III mineralized slope. The density and mineral content of cobalt-rich crusts mineralized in different stages are different, so their specific gravity, water content and metal density are also different. Where FIG. 6 shows the slope mineralized block segment of divided statistical units: firstly, statistical $Unit_1$, $Unit_2$ and an arbitrary unit $Unit_i$; secondly, slope mineralization zones and geological survey stations. It is the Stage III mineralized slope on the left, in which two survey stations No. 1 and No. 2 are distributed; the upper part on the right side is the Stage I mineralized slope, in which the survey station No. 3 is distributed; the lower part is the Stage II mineralized slope, with no survey station; the middle part is landslide mass (no mineralized slope); thirdly, the superposition calculation of statistical units and mineralization zones, geological stations and other layers. The stage III mineralized slope is divided into two blocks by Thiessen polygons method according to two geological survey stations, and each block has one survey station. Finally, the mineralized blocks of statistical units. The unit $Unit_1$, in addition to one non-mineralized block, has two blocks controlled by geological survey stations, $Block_{1,1}$ and $Block_{1,2}$, both of $Block_{1,1}$ and $Block_{1,2}$ belong to the Stage II mineralized slope; the unit $Unit_2$, in addition to one non-mineralized block, has two blocks, one is $Block_{2,1}$ controlled by the survey station No. 3, which belongs to the Stage I mineralized slope; the other one is II2,1, without the survey station control, and belongs to the Stage II mineralized slope. $Unit_i$ (i=1, 2, . . . , N) represents any unit $Unit_i$ in N statistical units.

Then, within the mineralized zone, according to the geological survey stations, the mineralized blocks controlled by each geological station are divided by using the Thiessen polygons segmentation method or the buffer zone method representing the influence range of geological stations.

Secondly, according to the slope mineralization zone and the control range of geological stations, each statistical unit is subdivided into several mineralized blocks (As shown in FIG. 6). For example, any statistical $Unit_i$ may be divided into Mi mineralized blocks $Block_{i,j}$ (j=1, . . . , $M_i$) controlled by geological stations, and $K_i$ mineralized blocks $I_i$ (i=1, 2, . . . , $K_i$) of the Stage I mineralized slope, $L_i$ mineralized blocks $II_i$ (i=1, 2, . . . , $L_i$) of the Stage II mineralized slope, or $J_i$ mineralized blocks $III_i$ (i=1, 2, . . . , $J_i$) of the Stage III mineralized slope. These blocks are either controlled by geological survey stations or mineralization stages. The statistical units are divided into several mineralized blocks, and each mineralized block is endowed with resource parameters and mineralization characteristics of cobalt-rich crusts according to geological station or slope mineralization period. In order to express easily, all blocks may be represented by $Block_{i,j}$ (j=1, . . . , $M_i$).

The statistical unit layer is spatially overlapped with mineral resources layers such as geological stations and slope mineralization zones, and the statistical unit is divided into several mineralized blocks. The resource parameters or mineralization characteristic values of these blocks are assigned by their geological stations or slope mineralization characteristics. The resource reserves of each sub-block of the statistical unit are calculated separately, and then summed to obtain the resource reserves of the statistical unit. Due to the sparse data, many times a statistical unit contains only one sub-block, and even a sub-block contains multiple statistical units.

1.2.2 Spatial Interpolation Assignment Method

The spatial interpolation assignment method takes the thickness data of geological survey stations as information points, and performs spatial interpolation on each statistical unit to obtain the only cobalt-rich crust thickness parameter. This spatial interpolation method may be the method of weighted mean of inverse distance, the moving window averaging, or the geostatistical method. Because the conventional geostatistical method is not suitable for the interpolation application of seamount spatial data, Du Dewen et al. put forward the seamount geostatistical method, that is, using "distance-slope" variogram Kriging method to estimate the crust thickness of Il'ichev Guyot seamount. The variogram simulation is to find out the autocorrelation of the spatial distribution of crusts by statistical methods, and may borrow the adjacent information points with similar distribution characteristics for experiments or simulations. Kriging estimation of shell thickness may only use this variogram and the information points in this area to perform Kriging equation operation to achieve interpolation. It also shows that geological station information is the most effective way to improve the understanding of crust thickness distribution. The statistical method may only use the existing conditions to obtain the approximation knowledge of the spatial distribution of objects, and the approximation degree depends on the layout and density of sampling stations. After evaluating the crust thickness based on the geological station information and the "distance-slope" Kriging method, each statistical unit $Unit_i (i=1, 2, \ldots, N)$ is assigned to obtain the unique solution of the cobalt-rich crust thickness of the statistical unit.

1.2.3 Expected Value Assignment Method

In the stage of seamount geological survey, the survey data of a number of cobalt-rich crusts stations are obtained, and the crusts thickness is estimated by calculating the average values of crusts resource parameters of stations in geological units, that is, expected values, which are used to assign values to each statistical unit. This method is called "an expected value assignment method". This assignment method is simple and easy, which is suitable for the parameters of cobalt-rich crusts with little spatial change, but not for the parameters with large spatial change.

Expected value estimation of all seamount resource parameters refers to counting the resource parameters of all geological survey stations of one or more adjacent seamounts, obtaining the average values of all parameters, and then estimating the expected value of all seamount resource parameters (referred to as "seamount expected value" for short), using seamount expected values to assign value to the statistical unit $Unit_i$ ($i=1, 2, \ldots, N$), it is suitable for assigning value to resource parameters with small deviation of all seamounts.

The expected value estimation of mineralized slopes in the same period, that is, a seamount slope is divided into several slopes with different mineralization periods. The expected value of resource parameters obtained from the statistics of resource parameters of slope stations in the same mineralization period is called the expected value of resource parameters of the same mineralization slope (referred to as "the expected value of the same mineralization"). Using the expected value of the same mineralization to assign value to the block of the statistical unit $Block_{i,j}$ ($j=1, \ldots, M_i$; $i=1, 2, \ldots, N$). Compared with the whole seamount geological survey stations, the deviation of resource parameters of the sub-slope stations in the same mineralization period is smaller, which is more suitable for assigning values to the statistical units of the sub-slopes in the same mineralization period.

1.2.4 Joint Assignment Method

Figure 7A:
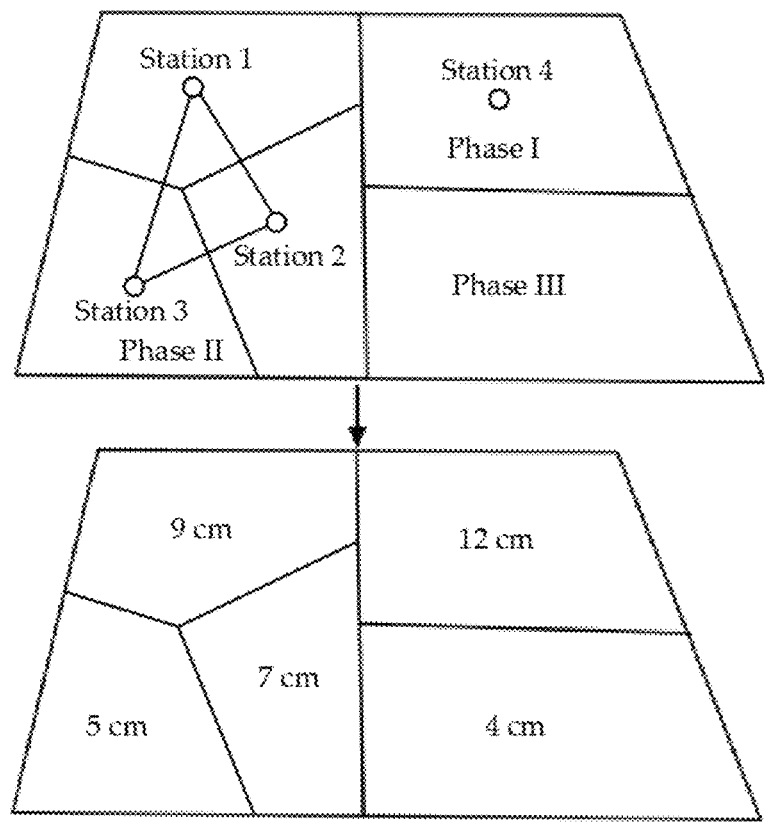
FIG. 7A and FIG. 7B are schematic diagrams of an assignment method according to the embodiment of the present application; where
Figure 7B:
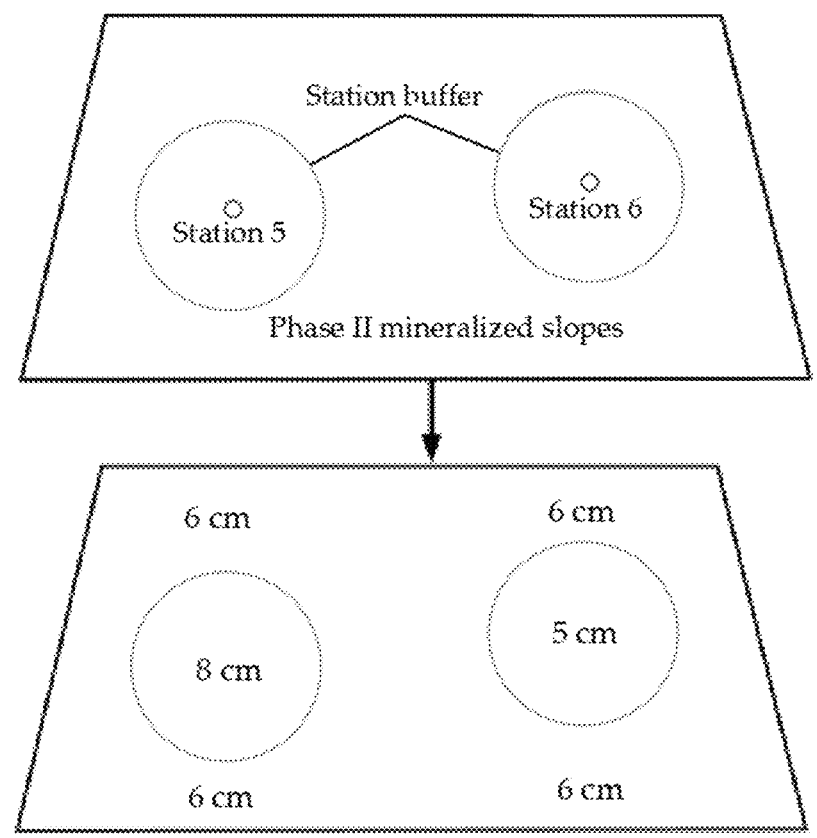

The joint assignment method is to combine the above methods for assignment. When there are many stations, the statistical units of this kind of slope are spatially interpolated by using the slope information points of the same mineralization period; when the stations are sparse, the Thiessen polygons block method may be used to assign values, as shown in FIG. 7A; when there is no geological station control, the expected value of the slope in the mineralization period is used for evaluation; when the geological station is isolated, its buffer zone is used to assign values to its surrounding slopes, and other slope ranges are assigned values by expected values of mineralization stages, as shown in FIG. 7B.

2. Application

The thickness of cobalt-rich crust is controlled by many factors, such as the slope type and the water depth, and the range of spatial distribution may reach 1 centimeter-30 centimeters. According to the accuracy requirement of the resource evaluation target, different assignment methods are selected: a. The adjacent area method assigns values to adjacent areas according to the crust thickness of the station; b. The spatial interpolation assignment method assigns crust thickness values to statistical units ($Thickness_i$, $i=1, 2, \ldots, N$); c. The mineralized block assignment method assigns values to each block of statistical units ($Thickness_{ij}$, $j=1, 2, \ldots M_i$; $i=1, 2, \ldots, N$). Here, the comprehensive evaluation method is used to obtain the crust thickness values of statistical units.

2.1 Division of Geological Grid Units

Figure 8:
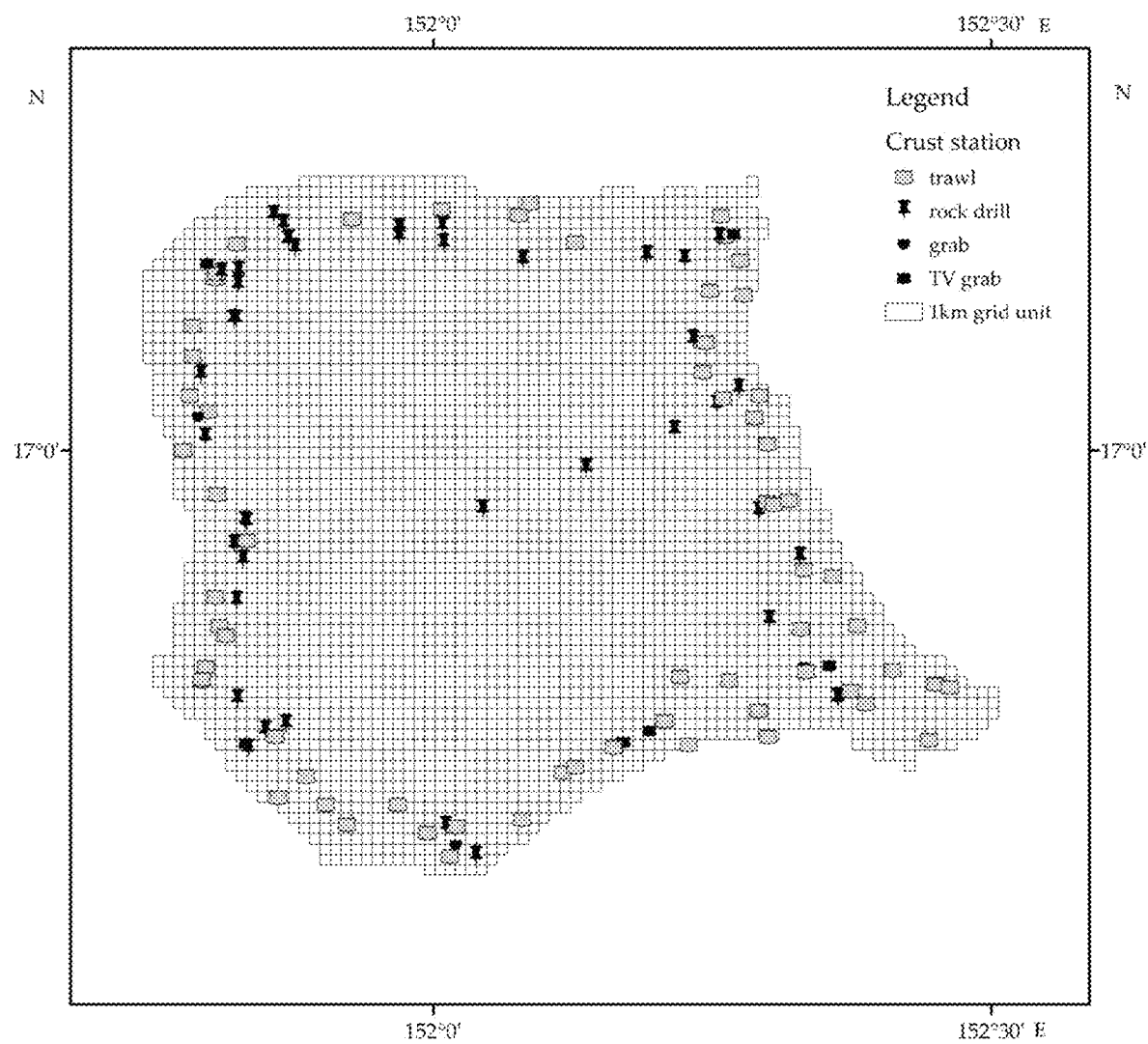
FIG. 8 is a schematic diagram of geological grid unit division according to the embodiment of the present application.

In order to facilitate the resource evaluation, firstly, geological grid units are divided. The accuracy of Il'ichev Guyot seamount terrain data is 230 meters×230 meters, which may be converted into 250 meters×250 meters precision data. As the smallest data unit, in order to ensure that each geological unit has enough statistical data, the study area is divided into 1-kilometer×1-kilometer grid units, and each unit contains 25 statistical data points. Grid division of geological units in the study area is realized by FishNet function of ArcGIS. The 3500 meters boundary of unsupervised topographic classification is the depth of CCD in this area, which is just the lower water depth of sampling station (with crust samples), that is, the shallow crust growth coverage of Il'ichev Guyot seamount at 3500 meters. Therefore, the geological units of the study area are divided by taking the 3500 meters isobath as the lower boundary of the resource evaluation area, and a total of 3706 geological unit grids are divided, each of which contains 25 data points. As shown in FIG. 8.

2.2 Adjacent Area Division and Statistical Unit Assignment

Figure 9A:
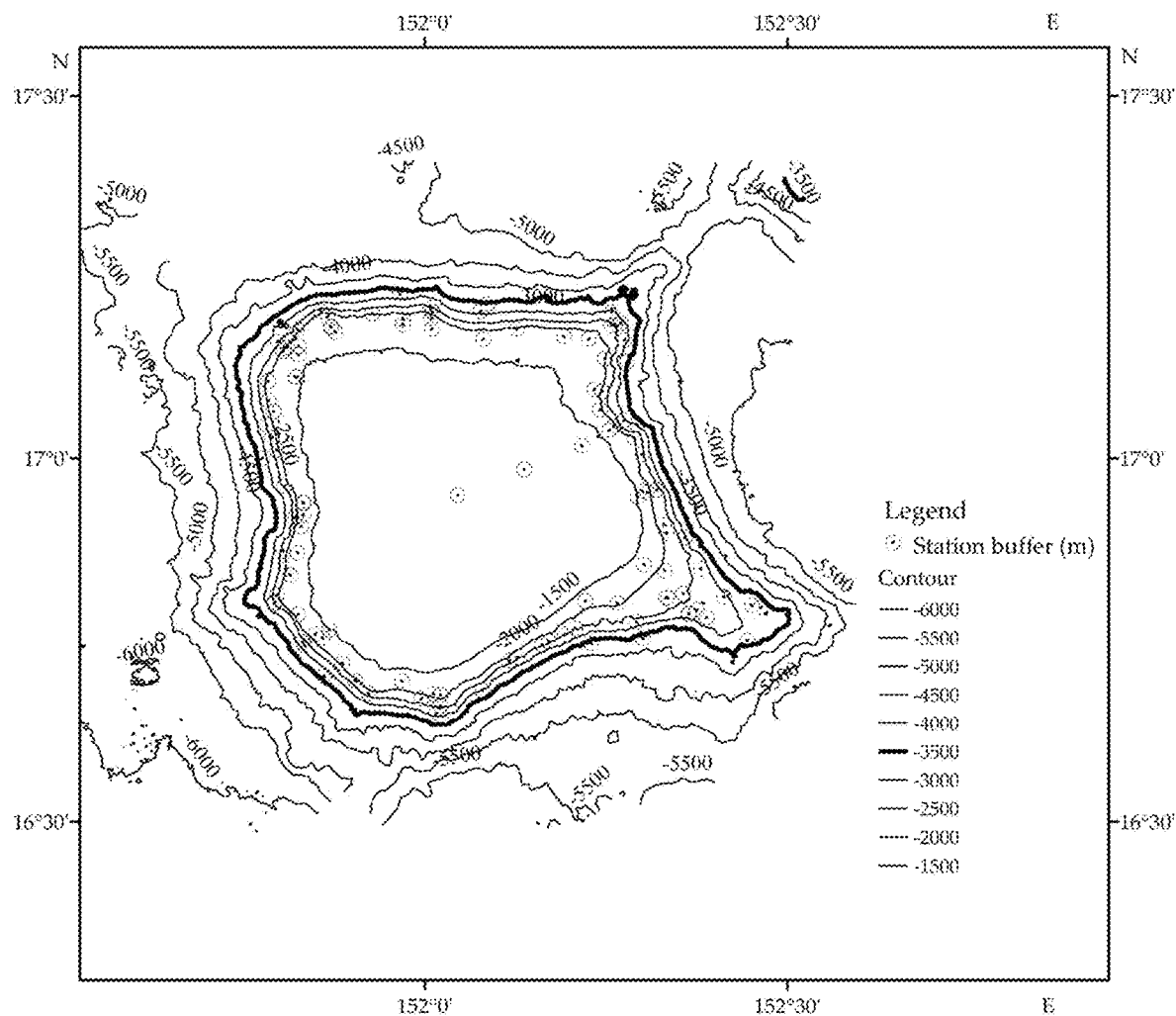
FIG. 9A and FIG. 9B are schematic diagrams of dividing geological statistical units by an adjacent area method according to the embodiment of the present application; where
Figure 9B:
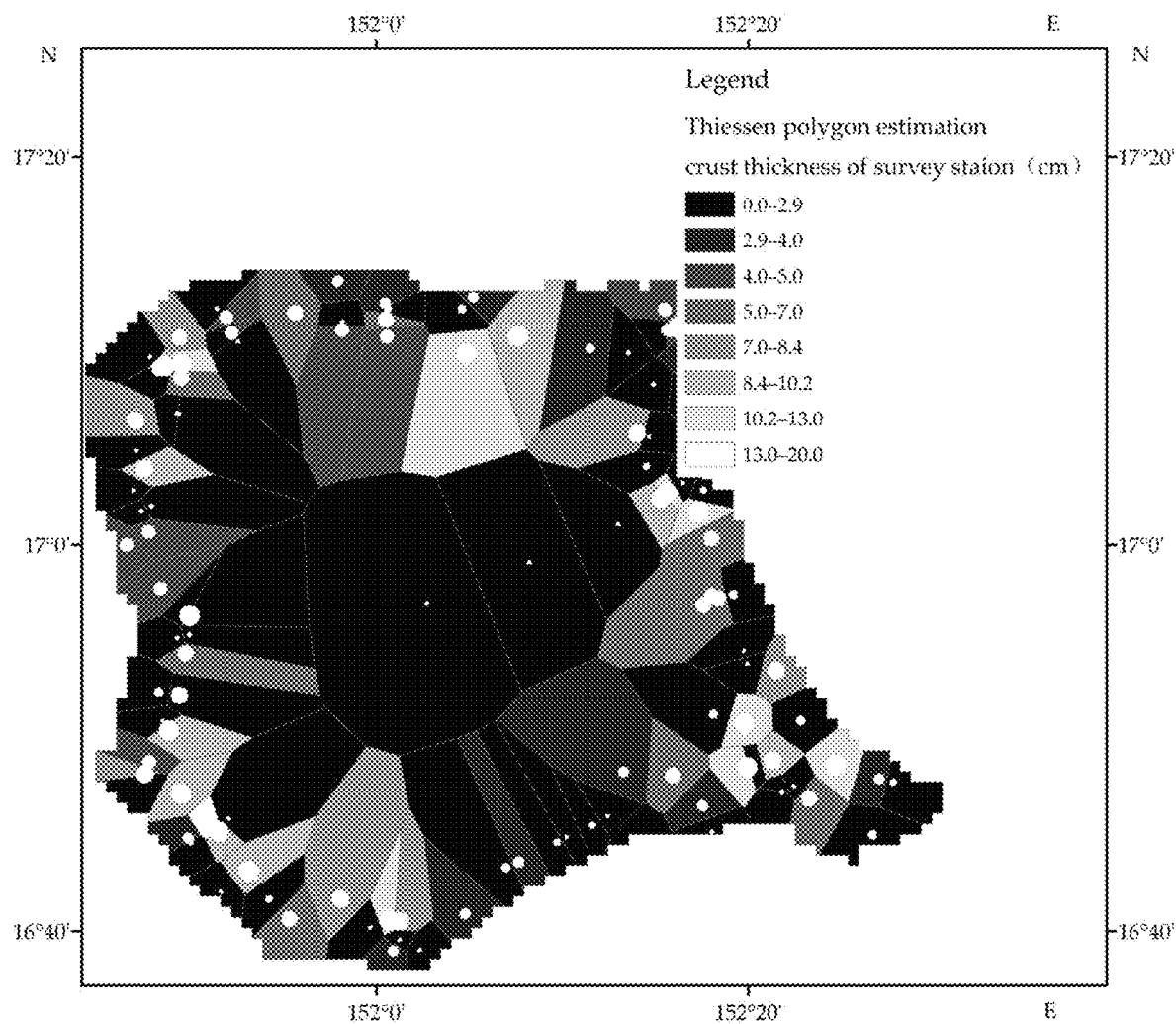

The division of geological units in the vicinity of the seamount in Il'ichev Guyot includes: firstly, according to the geological sampling stations, evaluating the influence range of the stations, using the bufur method of ArcGIS, setting the buffer radius of 1.5 kilometers to establish the station buffer zone, and dividing the preliminary blocks, as shown in FIG. 9A. Secondly, taking the lower boundary of the ore body in the study area as the boundary, generating the geological units controlled by stations in the whole area by using the Thiessen polygons method (ArcToolbox-Analysis Tools-Proximity-Create thiessen polygons) (1.2.1), that is, generating the Blocks in the previous article (1.1.2). As shown in FIG. 9B.

Figure 10:
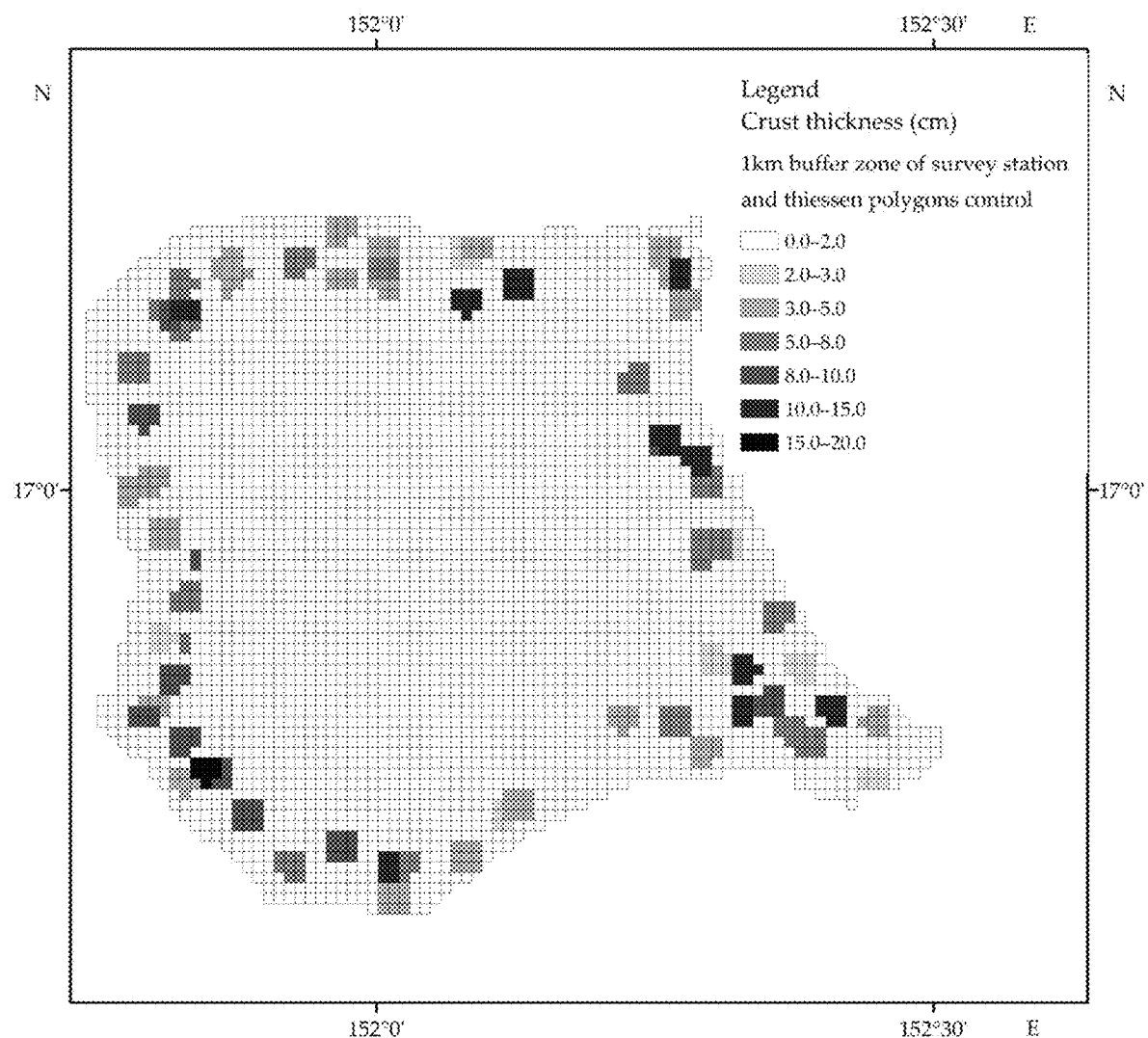
FIG. 10 is a schematic diagram of an assignment of adjacent area grid units according to the embodiment of the present application.

There are few information points of crust thickness in Il'ichev Guyot seamount. According to the actual situation of crust geological sampling survey density, in order to make full use of geological sampling information, firstly, obtaining the crust thickness distribution parameters of 1.5 kilometers buffer zone according to the station, as shown in FIG. 9A, and then obtaining the crust thickness parameters of the adjacent area of the station by Thiessen polygon, as shown in FIG. 9B. Jointly assigning values to 1 kilometer grid units by taking the adjacent area controlled by the buffer zone of the former station as the main area, and the boundary between adjacent stations delimited by the later Thiessen polygons (FIG. 9B) as the auxiliary area. The assignment result is shown in FIG. 10.

2.3 Spatial Interpolation Assignment

Figure 11:
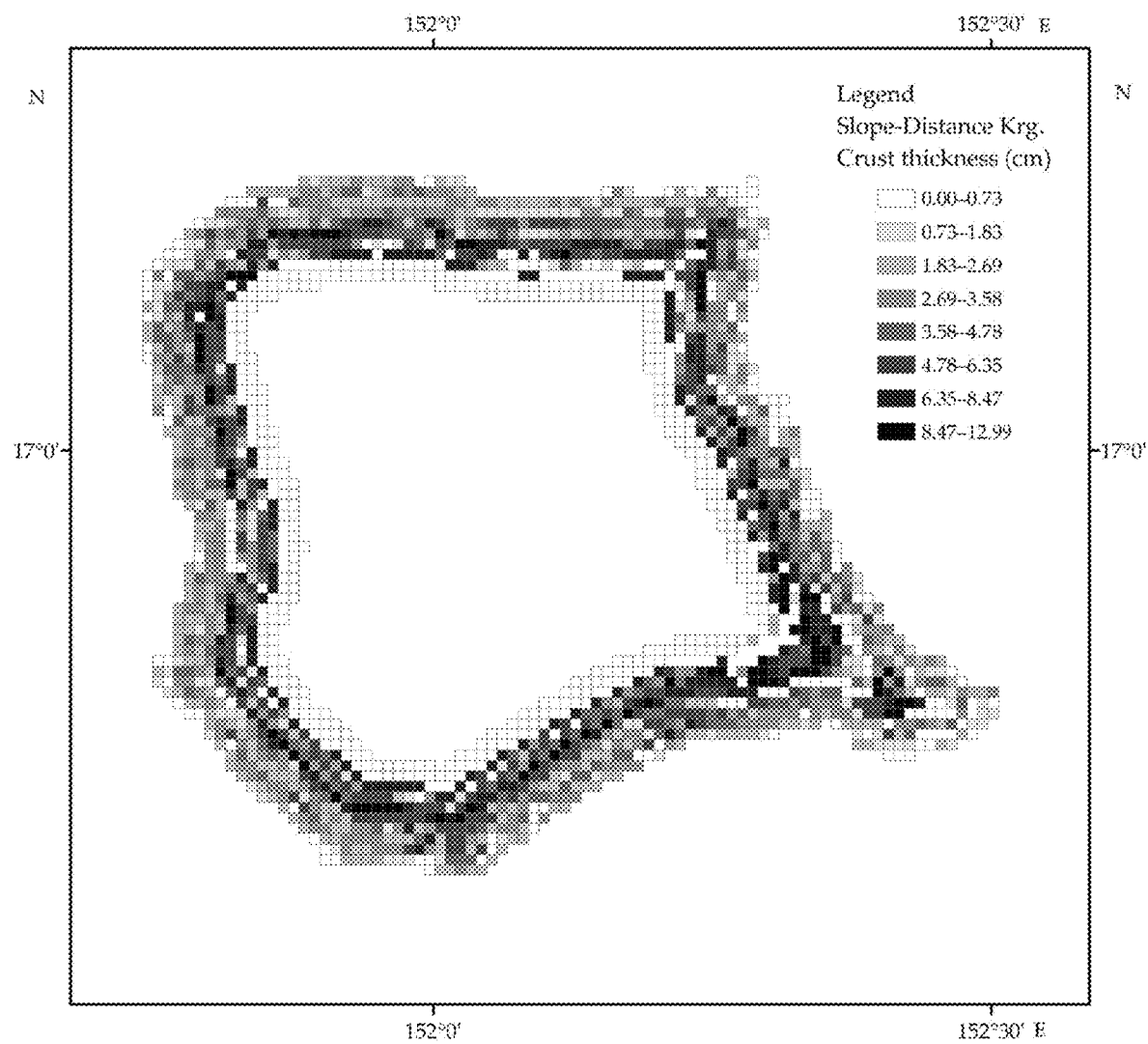
FIG. 11 is a distance-slope Kriging interpolation diagram according to the embodiment of the present application.
Figure 12:
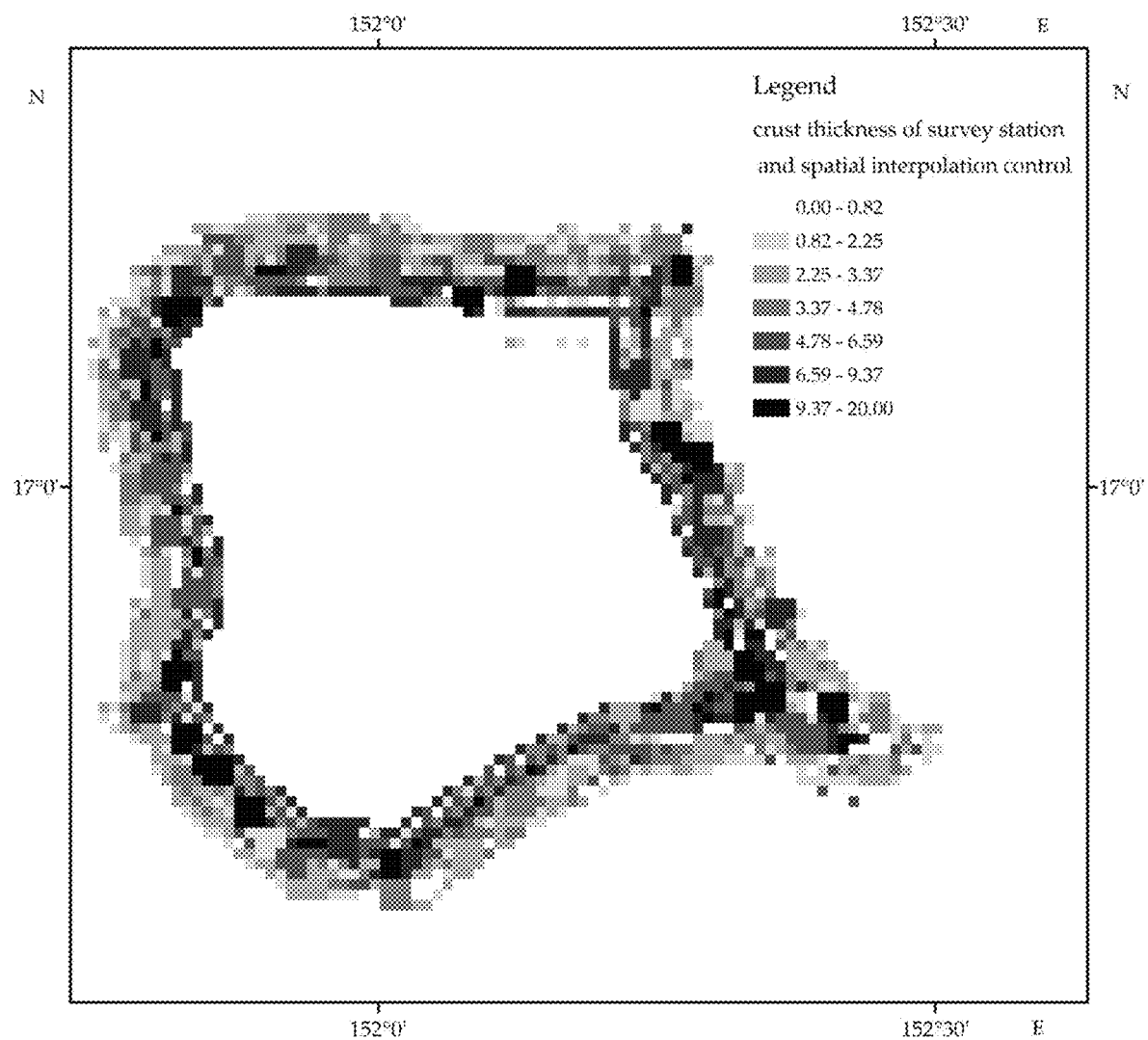
FIG. 12 is a schematic diagram of a superposition assignment of the adjacent area method and the spatial interpolation method according to the embodiment of the present application.

In order to realize the interpolation assignment of "distance-slope" Kriging method, firstly, processing the topographic data to make its range consistent with the coverage of the divided geological unit (1 kilometer×1 kilometer). Secondly, in ArcMap10.0, using the Slope method to calculate the slope of each point in the 250 meters precision terrain data, and then calculating the average slope of 25 points in each geological unit grid as the slope of the geological unit. Carrying out the spatial superposition and the correlation of the crust survey stations and the geological statistical units to obtain the average slope of each station (1-kilometer×1-kilometer range). Obtaining the 3500 meters isobath distance from each station to the lower boundary by using the Near method of ArcToolbox-Analysis Tools. Using this distance and slope as the coordinate values of the "distance-slope" coordinate system of station points, all station points will be regenerated into the spatial layer "distance-slope.shp" in ArcMap. For the stations in the new layer ("distance-slope.shp"), the Kriging method in Geostatistical Analyst is used to simulate the crust thickness data by variogram. According to the parameters of variogram simulation results and crust investigation experience, spatial interpolation is carried out with a radius of 2 kilometers, as shown in FIG. 11. According to this, the statistical units that have not been assigned after step 4.2 are superimposed and assigned, and the result is shown in FIG. 12.

2.4 Block Division and Statistical Unit Assignment

Figure 13:
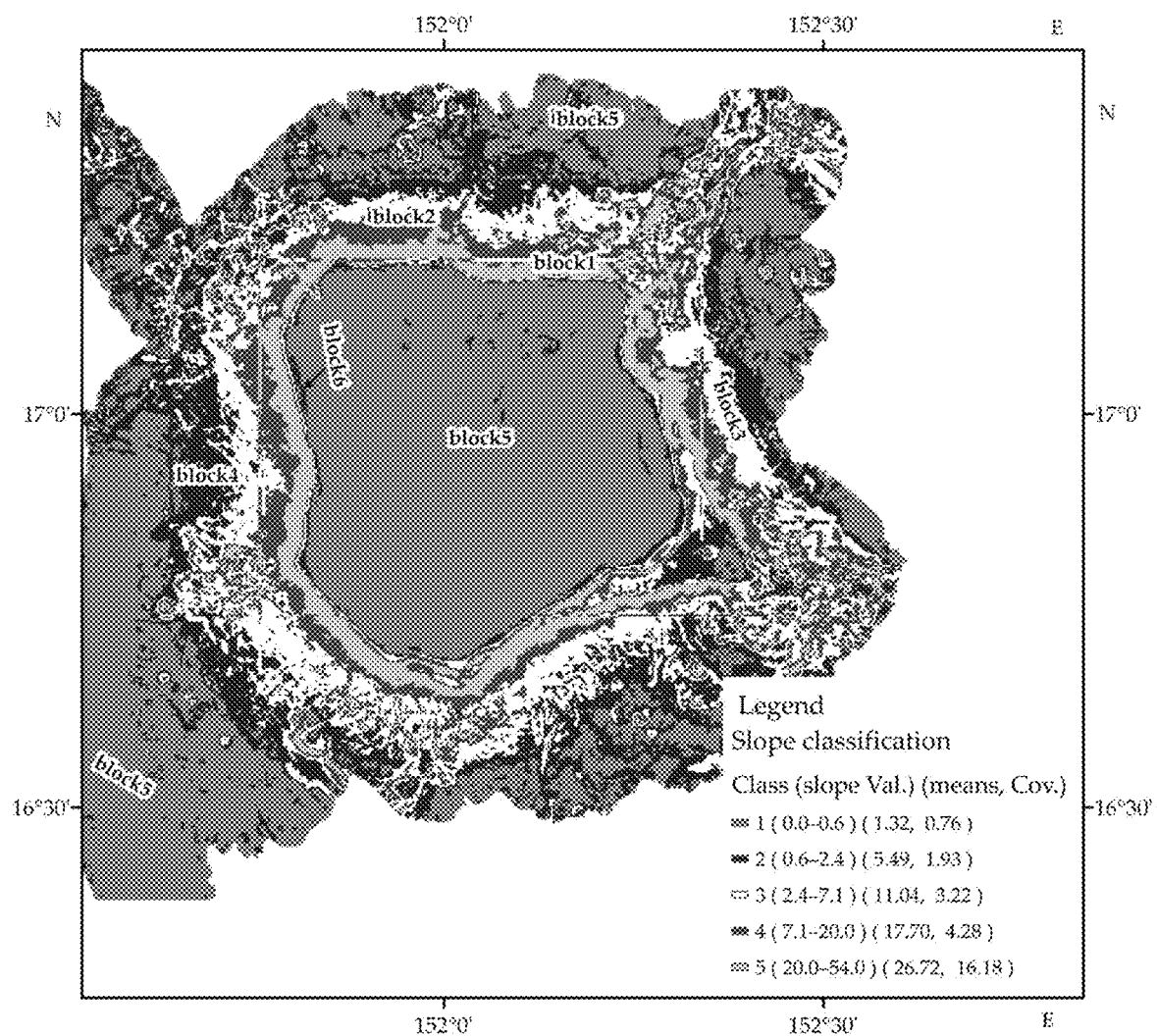
FIG. 13 is a schematic diagram of a micro landform block division based on a slope classification according to the embodiment of the present application.

For Il'ichev Guyot seamount geological block division, firstly, the Slope method is used to calculate the topographic slope, and then the Iso Cluster Unsupervised Classification method is used to classify the slope data, as shown in FIG. 3C. According to the degree of terrain change, the boundaries of different terrain types are divided and vectorized, and the lower boundary is defined by the regional boundary (3500 meters isobath) covered by crust geological units, as shown in FIG. 13. The boundary values of unsupervised slope classification are 4.8, 15, 27, 42, respectively, according to which geological blocks based on micro-topography classification are divided. The average thickness of crust sampling stations included in each classification area, i.e. block section, is 5, 4.3, 2.8, 2.0 and 1.5 respectively. This is used to assign values to geological blocks, as shown in FIG. 13.

Figure 14:
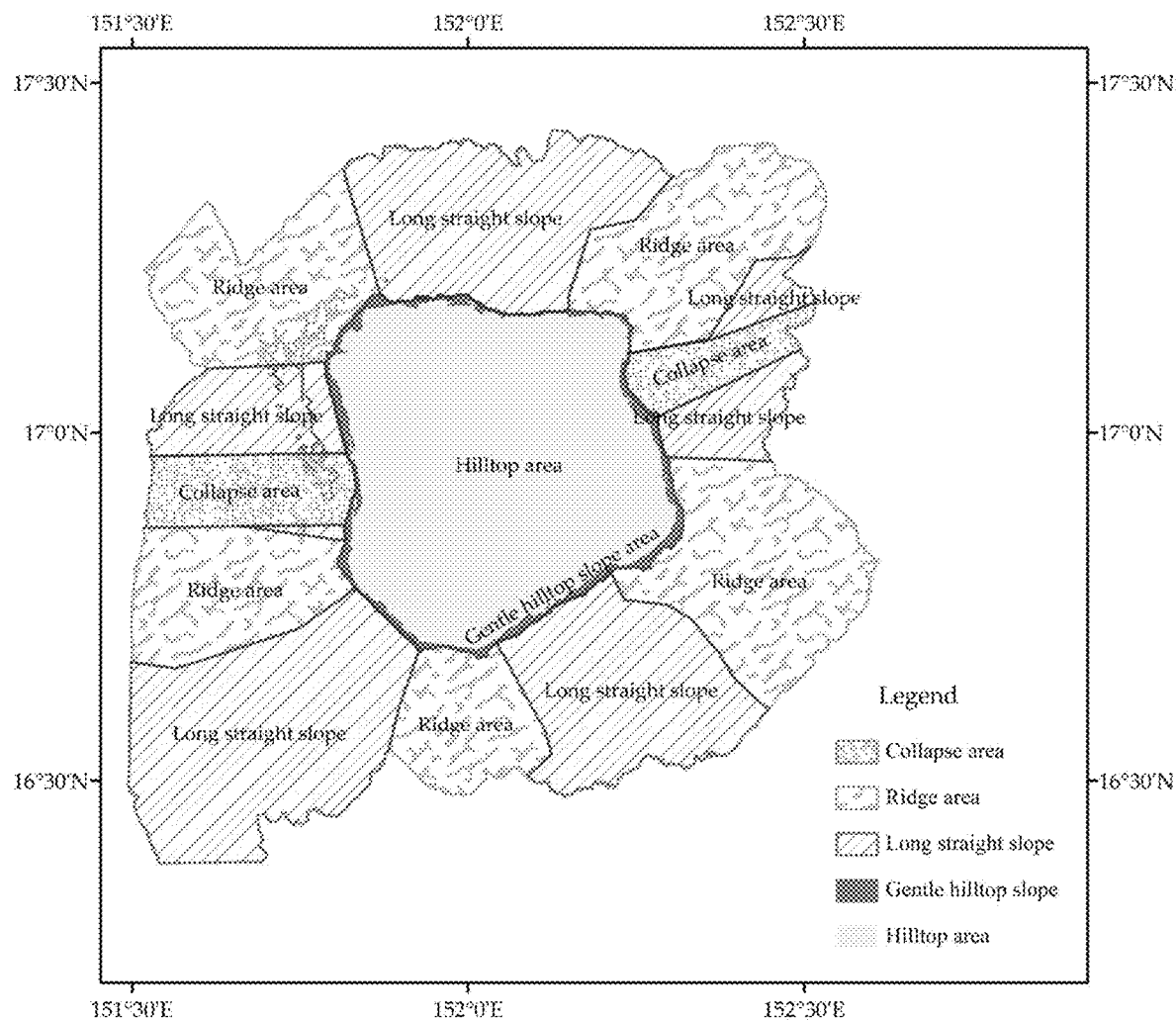
FIG. 14 is a schematic diagram of dividing geological statistical units by a topographic classification method according to the embodiment of the present application.

According to the classification results of micro-topography (FIG. 13), combined with the original topographical features and the intuitive form of slope change, seamounts are divided into gentle hilltop areas, gentle hilltop areas at the junction of hilltop and slope, ridge areas with various micro-topography, long straight slope areas and "spoon-shaped" collapse areas, and geological blocks based on landform types are divided accordingly, as shown in FIG. 14.

This kind of slope may be delineated by means of slope classification and identification. It is often characterized by "spoon-shaped" terrain, and this area is called "collapse area" in this embodiment. The collapsed area of spoon-shaped landslide is a landslide body in the geological history, and the crust thickness on the exposed bedrock is 0, and the slope is generally greater than 15o. Moreover, when the slope is greater than 15o, it is unfavorable to the mining work of the current mining technology, and it is unfavorable mining terrain and should be excluded from the mining area. The calculation shall focus on a detailed estimation of the proportion of unfavorable terrain within each exploration unit.

The slope covered by cobalt-rich crusts is called "mineralized seamount slope" (referred to as "mineralized slope" for short). This kind of slope has two major characteristics: one characteristic is the slope is non-gentle, and the other characteristic is that there has been no slope reconstruction since the middle and late Quaternary. The amount of resources distributed on the mineralized slope is the amount of natural resources. In terms of topography, it is characterized by "gentle slope at the top of the mountain", "long straight slope" or relatively stable "ridge area". Slopes that are not covered by sediments and are suitable for mining are considered as favorable slope areas, and the proportion of these slope areas in grid units is an important parameter for estimating the amount of mineable ore or metal reserves.

Figure 15:
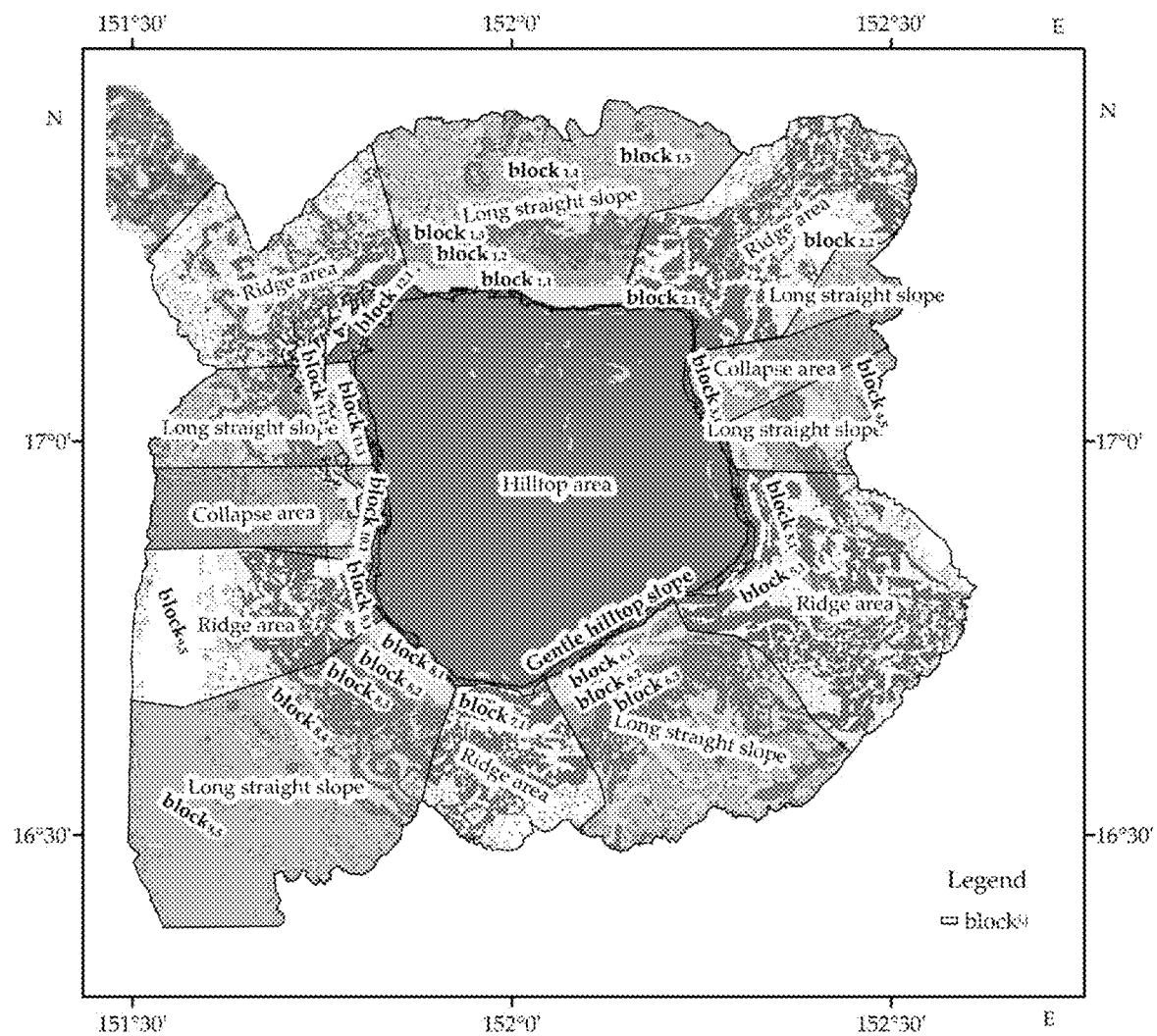
FIG. 15 is a schematic diagram of combine of micro landform block and geological statistical units block.

Spatially superposing the above geological blocks based on micro-topography classification and the geological blocks based on geomorphology types, and dividing new and more detailed geological blocks after superposition, as shown in FIG. 15.

Figure 16A:
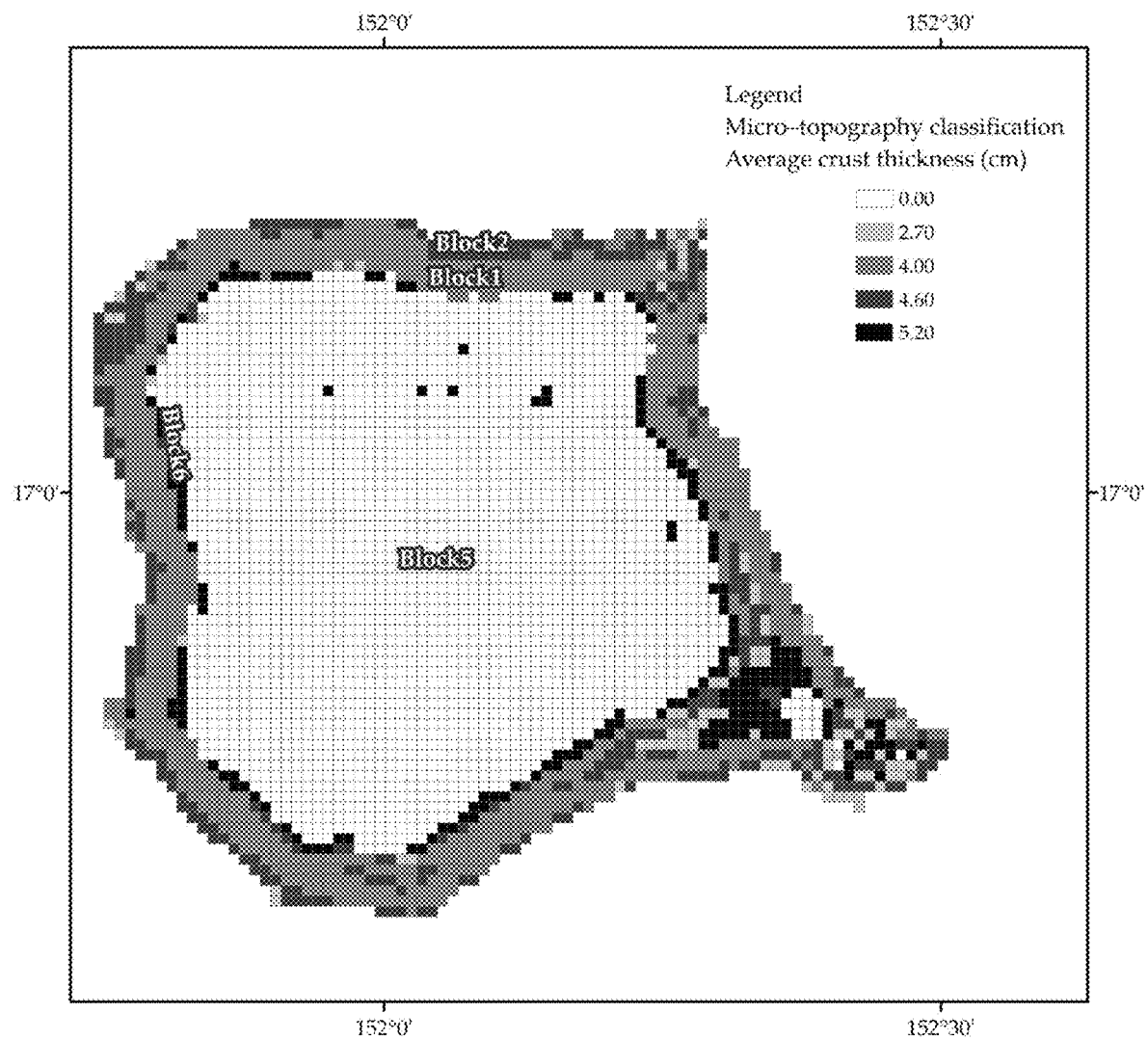
FIG. 16A, FIG. 16B and FIG. 16C are mineralized block method assignment diagrams for statistical units. where
Figure 16B:
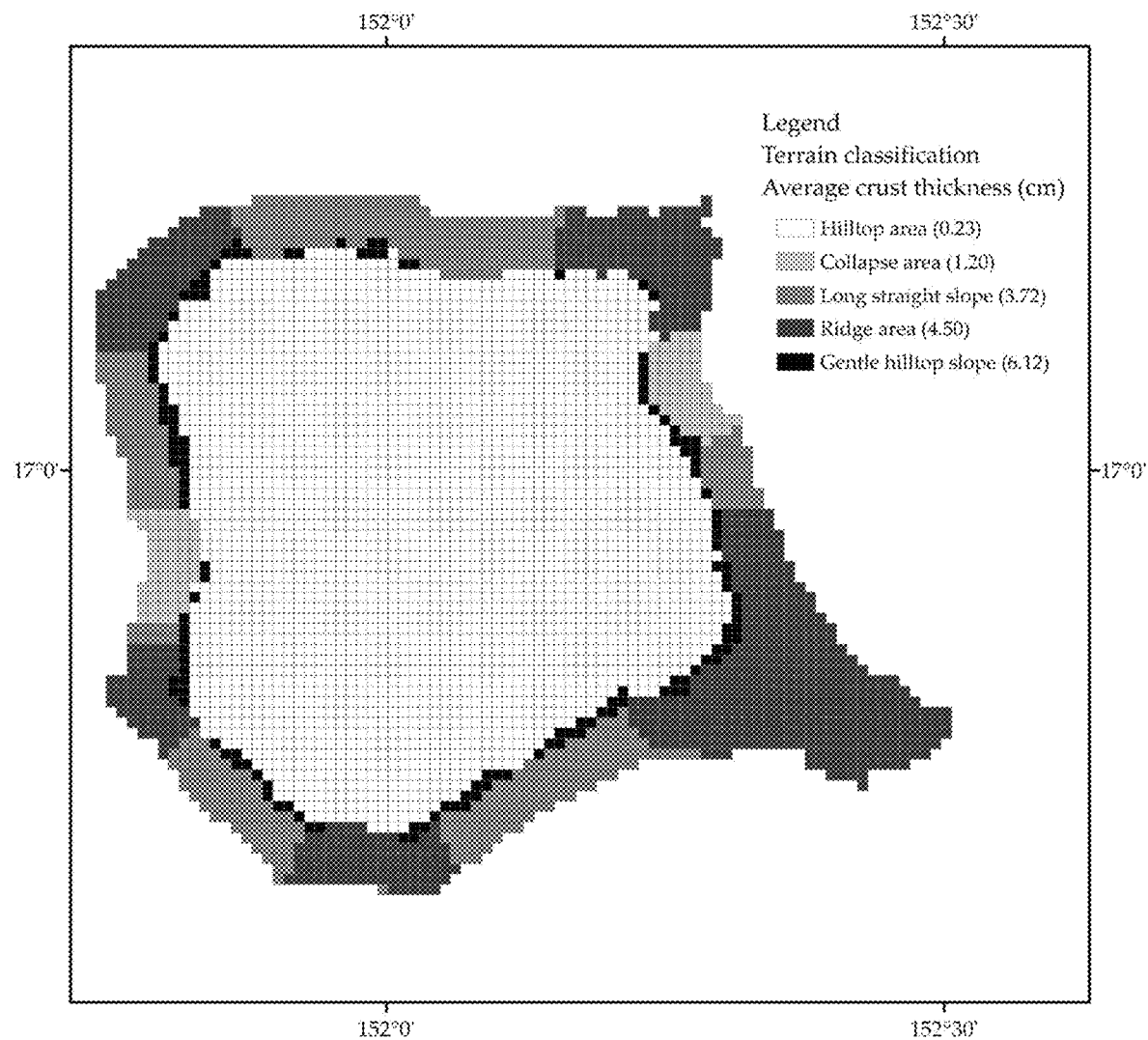
Figure 16C:
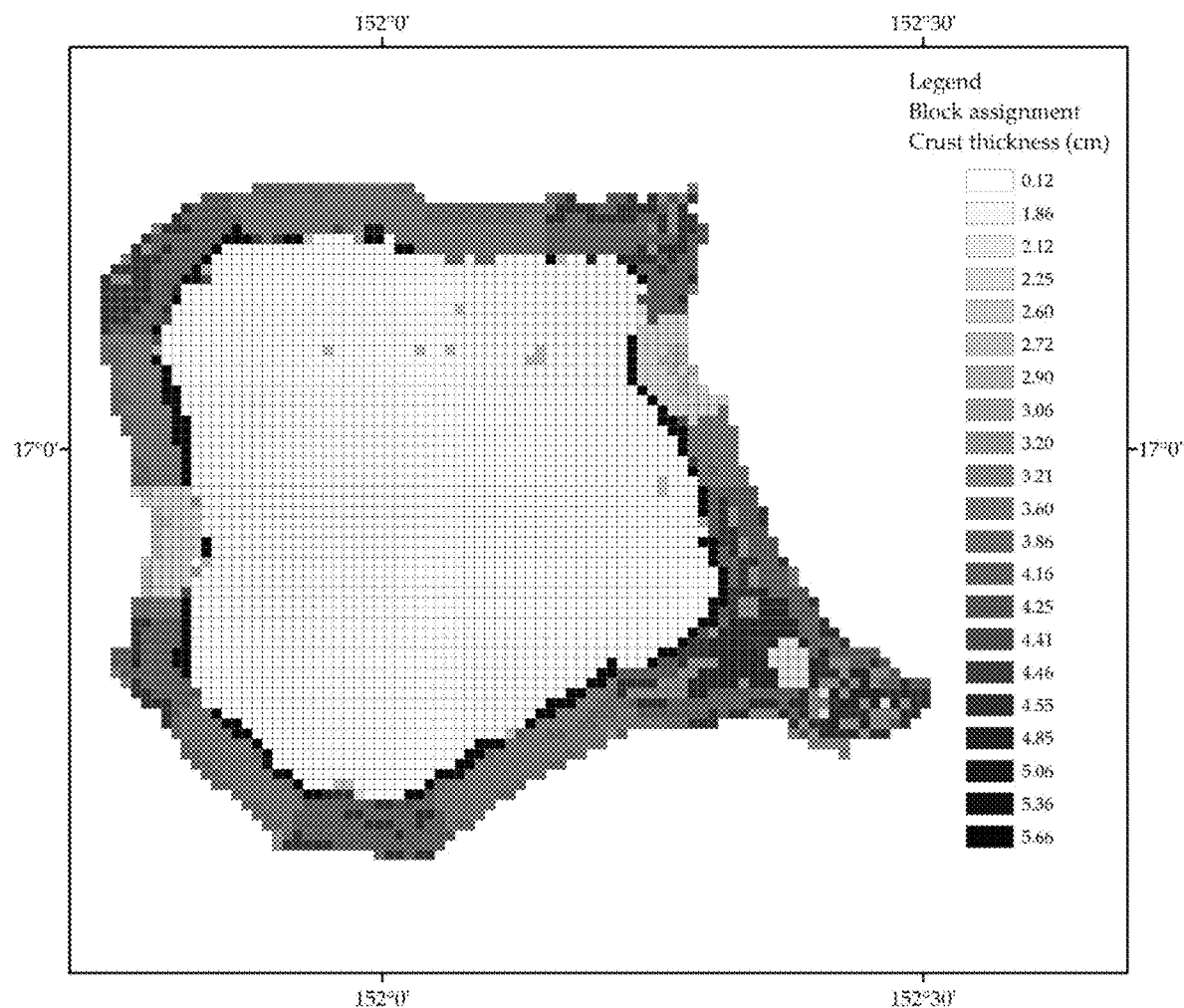

In FIG. 13, the mean thickness of the crust stations of block1, 2, 3, 5 and 6 are 4.00, 4.60, 2.70, 0.00, 5.20, respectively, as shown in FIG. 16A. In FIG. 14, the mean thicknesses of the crust stations in the five geomorphologies are 1.20, 6.12, 4.50, 3.72, and 0.23, respectively, as shown in FIG. 16B. Then the crust thickness of the geostatistical grid cell is obtained by superposition of FIG. 16A and FIG. 16B, as shown in FIG. 16C. FIG. 16C shows the obtained crust thickness assignment results from the classification of topography slope and geomorphological classification.

Figure 17:
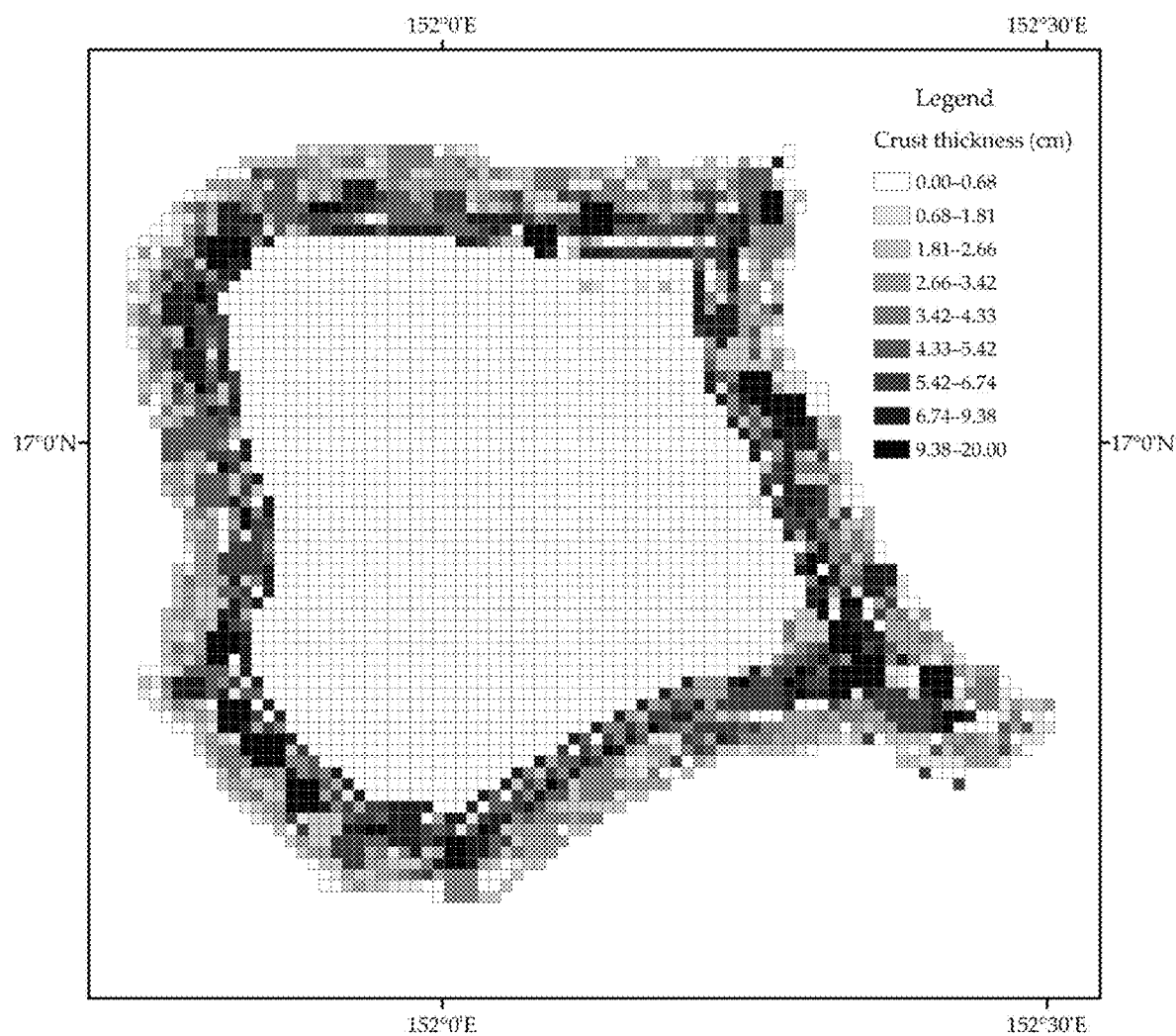
FIG. 17 is a schematic diagram of crust thickness results of geological grid units in the study area obtained by the comprehensive method according to the embodiment of the present application.

Synthesizing the evaluation results of grid units obtained in 2.3, supplementing the above-mentioned unassigned grid unit crust thickness values with the assignment results of geological grid units in FIG. 16C, and finally complete the crust thickness assignment of the whole regional geological grid unit, as shown in FIG. 17.

It may be seen from the assignment results in FIG. 17 that the crust thicknesses are clustered near the survey stations, which is related to the assignment method. With the change of seamount topography, the crust thicknesses change regularly, are distributed in a ring shape, and the thickness distribution in the collapsed area and the large long straight slope area is obviously different from other parts. It is consistent with the investigation and the research.

Different from previous research methods, this embodiment makes detailed analysis based on Il'ichev Guyot seamount geological sampling data and fine topographic data, divides seamount mineralization periods, and divides geological units accordingly. At the same time, the crust thickness evaluation scheme is comprehensively formulated by information such as the crust thickness buffer zones at the crust stations, the adjacent areas of the crust thicknesses at the stations, the expected crust thicknesses at the geological blocks, and spatial interpolation statistics. Firstly, using the station buffer zone method to calculate the crust thickness within 1.5 kilometers area around the station, and then using the Thiessen polygons method to evaluate the crust thickness covering the fully mineralized area according to the station position. Obtaining the best crust thickness within the range of 1.5 kilometers by combining the two obtained thicknesses, and assigning thickness values to the crust evaluation grid units. Secondly, calculating the crust thickness in the mineralized area by using "distance-slope" Kriging interpolation method and based on ArcGIS, and obtaining the crust thickness in the best effective radius area to make up for the missing part in the estimation results of the previous grid units. Finally, calculating the average crust thickness of geological sampling stations in geological units divided into mineralization stages by the mathematical expectation method, and assigning values to the remaining unassigned grid units. The method of "adjacent area-spatial interpolation of slope distance-geological block" proposed in this embodiment achieves good results in the application of the crust thickness assessment on Il'ichev Guyot seamounts. It shows that this method is suitable for evaluating the thicknesses of seamount crusts under the condition of incomplete investigation.

The above are only the preferred embodiments of this application, but the scope of protection of this application is not limited to this. Any changes or substitutions that may be easily thought of by those skilled in the technical field within the technical scope disclosed in this application should be included in the scope of protection of this application. Therefore, the scope of protection of this application is based on the scope of protection of the claims.

What is claimed is:

1. A method for evaluating thicknesses of cobalt-rich crusts on seamounts, the method comprising following steps:
   S1, dividing a study area of cobalt-rich crusts resources into geological grid units, and dividing the study area into adjacent areas based on geological sampling stations, wherein the adjacent areas comprise the geological grid units and the geological sampling stations;
   S2, obtaining thicknesses of crusts of the geological sampling stations in a preset influence range in the adjacent areas based on geological sampling information of the geological sampling stations;
   S3, assigning values to the geological grid units in the adjacent areas based on the thicknesses of crusts in the preset influence range in the adjacent areas, and obtaining the thicknesses of crusts of the geological grid units in the adjacent areas;
   S4, assigning the values to the geological grid units failing to be assigned by using an expected assignment method, so as to obtain the thicknesses of crusts of the study area; and
   S5, evaluating resources of the cobalt-rich crusts on the seamounts based on the thicknesses of crusts of the study area to obtain an evaluation result, and mining, based on the evaluation result, the resources of the cobalt-rich crusts on the seamounts.

2. The method for evaluating the thicknesses of cobalt-rich crusts on the seamounts according to claim 1, wherein dividing the study area into the adjacent areas comprises:
   drawing normals of connecting lines between two adjacent points of the geological sampling stations, obtaining intersection points between the normals and boundaries of the study area, obtaining cross nodes between the normals, dividing the study area into the adjacent areas based on the normals, the intersection points and the cross nodes, wherein when there is a cross node between the normals, a part of a normal beyond the cross node and an intersection point formed by an end of every normal beyond the cross node and a boundary of the study area is removed.

3. The method for evaluating the thicknesses of cobalt-rich crusts on the seamounts according to claim 2, wherein dividing the study area into the adjacent areas further comprises:
   combining the geological sampling stations with preset spatial thresholds into one geological sampling station, and connecting lines based on the combined geological sampling stations.

4. The method for evaluating the thicknesses of cobalt-rich crusts on the seamounts according to claim 1, wherein obtaining the thicknesses of crusts in the preset influence range in the adjacent areas comprises:
   obtaining the thicknesses of crusts of preset buffer zones based on the geological sampling information of the geological sampling stations, and obtaining the thicknesses of crusts in the preset influence range in the adjacent areas by combining Thiessen polygons and the preset buffer zones based on the thickness of crusts of the preset buffer zones.

5. The method for evaluating the thicknesses of cobalt-rich crusts on the seamounts according to claim 1, wherein assigning the values to the geological grid units in the adjacent areas comprises:
   estimating the thicknesses of crusts of the geological sampling stations in the preset influence range based on a "distance-slope" spatial interpolation method, and through a spatial similarity of a spatial distribution of crusts caused by a relationship between a distance and a slope, and assigning the values to the geological grid units inside and outside the adjacent areas and within an influence range of the spatial similarity.

6. The method for evaluating the thicknesses of cobalt-rich crusts on the seamounts according to claim 5, wherein the "distance-slope" spatial interpolation method comprises:
   acquiring slopes of the geological grid units in the adjacent areas;
   carrying out a spatial overlay and a spatial correlation on the slopes of the geological sampling stations and the geological grid units to obtain an average slope of each geological sampling station;
   obtaining an isobath distance from each geological sampling station to a lower boundary of the study area, taking the isobath distance as a coordinate value of a "distance-slope" coordinate system of the geological sampling stations, regenerating the geological sampling station into a spatial layer based on the coordinate value, carrying out a variogram simulation on crust thickness data by age statistical analysis method for the geological sampling stations in the spatial layer, and carrying out a spatial interpolation with a preset radius according to simulation result parameters of the variogram simulation and investigation experiences on crusts.

7. The method for evaluating the thicknesses of cobalt-rich crusts on the seamounts according to claim 5, wherein assigning the values to the geological grid units failing to be assigned by using the expected assignment method, so as to obtain the thicknesses of crusts of the study area, comprises:

acquiring topographic slope data of the study area, performing an unsupervised classification on the topographic slope data, dividing the study area into different terrain type boundaries according to a topographical change, performing a micro landform classification on the study area based on the different terrain type boundaries, and obtaining a micro landform classification area, and thereby obtaining geological blocks;

dividing the study area into preset geomorphic type areas based on the micro landform classification area and combined with original topographic characteristics and intuitive forms of slope changes, and obtaining the geological blocks related to mineralization stages of seamount crusts based on geomorphic types;

obtaining an original crust thickness average of the geological sampling stations in the preset geomorphic type areas and a crust thickness average of the geological sampling stations in the micro landform classification area based on a spatial distribution of known sampling stations, and obtaining a final crust thickness of the preset geomorphic type areas by superimposing the original crust thickness average of the preset geomorphic type areas and the crust thickness average in the micro landform classification area; assigning the values to areas outside the preset influence range of the geological sampling stations in the adjacent areas based on crust thickness of the preset geomorphic type areas, and finally obtaining crust thickness values of the geological grid units in the study area.

8. A method for evaluating thicknesses of cobalt-rich crusts on seamounts, the method comprising following steps:

S1, dividing a study area of cobalt-rich crusts resources into geological grid units, and dividing the study area into adjacent areas based on geological sampling stations, wherein the adjacent areas comprise the geological grid units and the geological sampling stations;

S2, obtaining thicknesses of crusts of the geological sampling stations in a preset influence range in the adjacent areas based on geological sampling information of the geological sampling stations;

S3, assigning values to the geological grid units in the adjacent areas based on the thicknesses of crusts in the preset influence range in the adjacent areas, and obtaining the thicknesses of crusts of the geological grid units in the adjacent areas;

S4, assigning the values to the geological grid units failing to be assigned by using an expected assignment method, so as to obtain the thicknesses of crusts of the study area, comprising:

acquiring topographic slope data of the study area, performing an unsupervised classification on the topographic slope data, dividing the study area into different terrain type boundaries according to a topographical change, performing a micro landform classification on the study area based on the different terrain type boundaries, and obtaining a micro landform classification area, and thereby obtaining geological blocks;

dividing the study area into preset geomorphic type areas based on the micro landform classification area and combined with original topographic characteristics and intuitive forms of slope changes, and obtaining the geological blocks related to mineralization stages of seamount crusts based on geomorphic types; and obtaining an original crust thickness average of the geological sampling stations in the preset geomorphic type areas and a crust thickness average of the geological sampling stations in the micro landform classification area based on a spatial distribution of known sampling stations, and obtaining a final crust thickness of the preset geomorphic type areas by superimposing the original crust thickness average of the preset geomorphic type areas and the crust thickness average in the micro landform classification area; assigning the values to areas outside the preset influence range of the geological sampling stations in the adjacent areas based on crust thickness of the preset geomorphic type areas, and finally obtaining crust thickness values of the geological grid units in the study area; and S5, evaluating resources of the cobalt-rich crusts on the seamounts based on the crust thickness values in the study area to obtain an evaluation result, and mining, based on the evaluation result, the resources of the cobalt-rich crusts on the seamounts.

* * * * *